(12) United States Patent
Kolokotronis

(10) Patent No.: US 12,456,793 B2
(45) Date of Patent: *Oct. 28, 2025

(54) ANTENNA SUPPORT SYSTEM AND METHOD OF INSTALLING THE SAME

(71) Applicant: Dimitris Kolokotronis, Athens (GR)

(72) Inventor: Dimitris Kolokotronis, Athens (GR)

( * ) Notice: Subject to any disclaimer, the term of this patent is extended or adjusted under 35 U.S.C. 154(b) by 723 days.

This patent is subject to a terminal disclaimer.

(21) Appl. No.: 17/769,273

(22) PCT Filed: Oct. 15, 2020

(86) PCT No.: PCT/EP2020/079119
§ 371 (c)(1),
(2) Date: Apr. 14, 2022

(87) PCT Pub. No.: WO2021/074335
PCT Pub. Date: Apr. 22, 2021

(65) Prior Publication Data
US 2024/0136698 A1  Apr. 25, 2024
US 2024/0235003 A9  Jul. 11, 2024

Related U.S. Application Data

(63) Continuation-in-part of application No. 16/653,163, filed on Oct. 15, 2019, now Pat. No. 11,831,065.

(51) Int. Cl.
*H01Q 1/12* (2006.01)
*H01Q 1/24* (2006.01)

(52) U.S. Cl.
CPC ......... *H01Q 1/1228* (2013.01); *H01Q 1/1242* (2013.01); *H01Q 1/1264* (2013.01); *H01Q 1/246* (2013.01)

(58) Field of Classification Search
CPC ...... H01Q 1/12; H01Q 1/1207; H01Q 1/1228; H01Q 1/1235; H01Q 1/1242; H01Q 1/125;
(Continued)

(56) References Cited

U.S. PATENT DOCUMENTS 2,415,103 A   2/1947   Langstroth
3,505,890 A   4/1970   Peterson
(Continued)

FOREIGN PATENT DOCUMENTS

CN   202616412 U   12/2012
CN   209249670 U   8/2019
(Continued)

OTHER PUBLICATIONS

International Searching Authority—European Patent Office, International Search Report, PCT Application No. PCT/EP2002/079119, dated Apr. 22, 2021, NL.
(Continued)

*Primary Examiner* — Robert Karacsony
(74) *Attorney, Agent, or Firm* — Reichel Stohry Dean LLP; Natalie J. Dean

(57) ABSTRACT

The present invention provides a system and method of modifying an existing antenna base station comprising the steps of replacing legacy antenna support brackets (10) with a new mast clamp arrangement (200) coupled with a steering and locking unit (100).

20 Claims, 23 Drawing Sheets

(58) Field of Classification Search
CPC ........ H01Q 1/1264; H01Q 1/246; H01Q 3/02; H01Q 3/04; H01Q 3/06; H01Q 3/08; F16B 2/00; F16B 2/02; F16B 2/06; F16B 2/065; F16B 2/12
See application file for complete search history.

(56) References Cited

U.S. PATENT DOCUMENTS

| | | | |
|---|---|---|---|
| 7,084,834 | B1 | 8/2006 | Hopkins |
| 9,437,918 | B1 | 9/2016 | Bales et al. |
| 11,831,065 | B2 * | 11/2023 | Kolokotronis ....... H01Q 1/1228 |
| 2010/0225802 | A1 | 9/2010 | Koji |
| 2013/0256477 | A1 | 10/2013 | Fackler |
| 2014/0048660 | A1 | 2/2014 | Lettkeman |
| 2014/0218249 | A1 | 8/2014 | Kolokotronis |
| 2018/0159199 | A1 | 6/2018 | Kolokotronis |
| 2018/0166765 | A1 | 6/2018 | Britz et al. |

FOREIGN PATENT DOCUMENTS

| | | |
|---|---|---|
| EP | 0975044 A3 | 1/2000 |
| EP | 2532901 A1 | 12/2012 |
| SE | 536614 C2 * | 4/2014 |
| WO | 2013171291 A2 | 11/2013 |
| WO | 2017174113 A1 | 10/2017 |
| WO | 2018055104 A1 | 3/2018 |
| WO | 2019110697 A1 | 6/2019 |

OTHER PUBLICATIONS

International Searching Authority—European Patent Office, Written Opinion of the International Searching Authority, PCT Application No. PCT/EP2002/079119, dated Apr. 22, 2021, NL.

International Searching Authority, International Search Report, PCT Application No. PCT/EP2018/083707, dated Mar. 27, 2019, NL.

International Searching Authority, Written Opinion of the International Searching Authority, PCT Application No. PCT/EP2018/083707, dated Mar. 27, 2019, NL.

* cited by examiner

ANTENNA SUPPORT SYSTEM AND METHOD OF INSTALLING THE SAME

PRIORITY

The present application is related to, and claims the priority benefit of, and is a 35 U.S.C. 371 national stage application of, International Patent Application No. PCT/EP2020/079119, filed Oct. 15, 2020, which is related to, and is a continuation-in-part and claims the priority benefit of U.S. application Ser. No. 16/653,163 filed Oct. 15, 2019. The contents of the aforementioned applications are hereby incorporated by reference in their entireties into this disclosure.

BACKGROUND OF THE INVENTION

Field of the Invention

The present invention relates to an improved antenna support system and method of installing the same. More specifically, the present invention is concerned with a system and method well suited to mounting modern cellular antennas to masts. By 'modern' cellular antennas we mean 5G technology and beyond, MIMO and massive-MIMO, multi-band, multi-beam, multi-directional, active or passive antennas.

Description of Related Art

Since the early days of mobile communication technology back in the 1990's, directional cellular antennas on towers and masts, have been installed using the same principle. The antennas had to be placed high from the ground in order to reduce the RF path-loss effects (or RF signal attenuation). The antennas also need to point in specific directions in the horizontal plane (i.e. at an azimuth angle about a vertical axis—alignment of the antenna directionality with respect to North) and in the vertical plane (i.e. tilt angle about an horizontal axis—alignment of the antenna directionality with respect to the earth's centre of gravity) in order to satisfy certain RF planning criteria for optimum coverage, capacity and quality of wireless communications.

In order to install antennas at a specified height from the ground, mobile communication networks worldwide adopted the engineering and design of very well-known tower and mast types such as lattice and pole systems. The terms "mast" and "tower" are often used interchangeably, and it is to be understood that the term "mast" is used in this application to cover both masts and towers. However, it will be noted that in structural engineering terms, a tower is a self-supporting or cantilevered structure, while a mast is held up by stays or guys.

The self-supported lattice is the most widespread form of construction. It provides high strength, low weight and low wind resistance, and is economic in its use of materials. Lattices of triangular cross-section are most common, and square lattices are also widely used. Guyed lattice masts are also often used; the supporting guy lines carry lateral forces such as wind loads, allowing the mast to be very narrow and of modular construction. The entire structure is constructed by creating a series of horizontal ladders, or internal triangular structures, that secure the tower's three, or four base legs. Guyed masts are also constructed out of steel tubes.

Last but not least, monopole rooftop masts (which may be covered with camouflage and/or a radome) have been installed on top of many buildings. With the advent of urban mobile communications, developers wanted a more efficient way to construct and operate low-height elevation systems for aesthetic reasons. They conceived the idea of the monopole rooftop configuration, a lattice mast with a pole on top used for antenna mounting. These configurations became more fashionable, once alternative construction materials began to exhibit greater strength and flexibility without failing. Today these free-standing masts are fabricated from various materials.

In order to install on towers and masts the antennas at specified direction with respect to North (azimuth alignment) and the earth's centre of gravity (tilt alignment), the industry adopted the engineering and design of antenna azimuth and tilt mounting brackets.

The antenna tilt bracket is a standard antenna accessory, delivered with the specific antenna purchased, and as such we will not further describe the various types of tilt bracket here. The most common type of antenna azimuth bracket in the field comprises a set of collars that are mounted on one side at the antenna tilt bracket and on the other side are fixed on a pole. Azimuth alignment is performed by loosening the collars, aligning the antenna and tightening the collars on the pole. More sophisticated antenna azimuth brackets are described in detail in the applicant's co-pending applications published as WO2019/110697 (incorporated by reference where possible).

Radio coverage of each antenna needs to be decided according to radio planning criteria.

On a typical 3-sector site, each directional antenna needs to be capable of 120 degrees azimuth and 20 degrees tilt range (10 degrees up-tilt and 10 degrees down-tilt). Even fully equipped with both azimuth and tilt brackets, an antenna cannot be directly installed on the mast structure and still be capable of full movement in both azimuth and tilt directions. The main reason for that is the fact that modern cellular antenna geometry (panel type) are bulky, long (may reach up to 3 meters length), wide (may be more than half a meter wide) and heavy (may weight more than 50 kgs); not to be mentioned that over a dozen coaxial cables are mounted on the bottom of the antenna that cannot be over-bended, especially when the antenna is to be down-tilted.

Using the well-known set of collars for performing azimuth steering and alignment, the antenna always needs to be mounted on a mast's structural member that is of circular shape, is capable of supporting the excessive weight and wind-load and of course has the required clearance from other antennas and the structure itself for azimuth alignment according to radio planning instructions (i.e. at least the first Fresnel zone should be always kept free of obstacles). This should be the case for pole masts, as poles are of circular shape and their main structural member is the pole itself, however, taking into account that usually 3 antennas (for a 3-sector site), half a meter wide and with azimuth range freedom of 120 degrees each are to be installed on the pole's top, the pole should have more than 1 meter diameter in order to perform. Using such poles for the purpose, is not only expensive but also impractical (most of the times impossible) to implement. The situation is complicated further when the pole is to be supported by wires.

For the lattice mast types (guyed or self-supported), the same or more problems are to be tackled.

Lattices of either triangular or rectangular cross-section may have 3 or 4 vertical upright structural members (of various shapes such as equal angles, hollows and the like) that are mounted together with multiple horizontal and diagonal cross-members, spaced apart in sets (the number of which determines the mast height), so as forming the desired lattice mast configuration.

Considering the known requirements for antenna mounting:
a) The antenna needs to be tightly secured, collinearly on a vertical structural member, otherwise the antenna reflector/backplane will twist. Geometric deformation of the antenna's reflector impacts its radiation performance, which is undesirable.
b) The antenna needs to be tightly secured with a baseline orientation perpendicular to the ground, otherwise both tilt and roll antenna dimensions will be offset from the global reference plane, which is the earth's centre of gravity.
c) The mast vertical structural members have limited available surface area for antenna mounting because the horizontal and diagonal cross-members are fixed to them in close patterns, and cannot be removed. The situation is further complicated when the lattice mast is to be supported by wires.
d) The antenna's vertical spacing of its top and bottom mounting points are fixed in position, which makes it very likely to coincide with the horizontal and diagonal cross-member mounting points on the mast vertical structural members. The situation is further complicated when the lattice mast is to be supported by wires.
e) The vertical members the antennas are attached to always need to have circular shape when using the well-known set of collars for performing antenna azimuth steering and alignment. This is not the case for the majority of lattice mast configurations.
f) An antenna of around three metres length and half a metre width needs to be placed spaced apart from the mast section on the horizontal plane in order to achieve azimuth steering of 120° range and tilt inclination of 20° range (up-tilt or down-tilt) without clashing on the mast structural members or other tower-top equipment installed.
g) After installation completion, it should be ensured that the antenna's first Fresnel zone is free of obstacles. Fresnel zone clearance is used to analyze interference by obstacles near the path of the antenna's main radiation beam. In establishing Fresnel zones, one needs to first determine the RF Line of Sight (RF LoS), which in simple terms is a straight line between the transmitting and receiving antennas. The zone surrounding the RF LoS is the Fresnel zone.

Having all these requirements in mind, the industry adopted the engineering and design of a universal antenna "support system" that could be installed without implementation problems on both pole and lattice masts while being capable for antenna azimuth and tilt alignment in order to satisfy both the structural engineering requirements and the radio planning instructions.

An example of a legacy antenna "support system" adopted by the industry is shown in FIG. 1.

Referring to FIG. 1 there is shown a cellular antenna mast 2 comprising vertical upright members 4 (hollow square section members in this example), horizontal cross-members 6 and bracing members 8. The mast 2 is a square-section lattice mast. For the purposes of the present disclosure, a "mast member" is a component that is part of the mast. In other words, it is structurally integrated with the mast to the extent that removal would cause structural problems. "Mast members" include monopole rooftop masts installed on buildings, possibly on top of a lattice structure, but not e.g. poles attached to the side of an existing mast (as with legacy systems).

The support system 10 comprises a pair of pole spacing supports 12, 14. Each support 12, 14 comprises a pair of elongate metal tubes 16, 18 welded on respective ends to mast clamps 30 and pole clamps 20. The mast clamps 30 are attached to the mast (specifically the upright members 4) by clamping. The pole spacing supports 12, 14 are attached to the mast at two spaced-apart vertical positions allowing for a minimum specified spacing of a pole 22 and antenna 24 from the cellular antenna mast 2. The antenna pole 22 is inserted through the pole clamps 20 of both pole spacing supports 12, 14 and clamped therein. The antenna pole 22 defines an antenna azimuth steering axis Z.

Allowing for the required spacing from the mast to be achieved, the pole spacing supports 12, 14 is also configured to allow the riggers to physically install the antenna, and set it at the desired azimuth and tilt direction. Antenna tilt brackets 26, 28 are installed each on pole 22. The antenna tilt brackets comprise azimuth collars 27, 29 that clamp the pole 22 and permit selective rotation about the steering axis Z. The collars 27, 29 of the mechanical tilt brackets can be tightened to inhibit antenna rotation about the azimuth steering axis. The mechanical tilt brackets 26, 28 also rotate the antenna in the vertical plane (inclination).

It will be noted that in this example, there are provided pole supports that have two mast clamps and a single pole clamp (i.e. in the shape of a "V"). Other systems are known which may have a single mast clamp and single pole clamp for each pole support.

In this way, the industry adopted the engineering and design of a universal antenna "support system" that could be installed without implementation problems on both pole and lattice masts while being capable for antenna azimuth and tilt alignment in order to satisfy both the structural engineering requirements and the radio planning instructions.

However, there are several problems with this approach.

Firstly, the pole spacing supports 12, 14, the mast clamps 30, the pole clamps 20, and also the pole 22 are all machined hot-dipped galvanized steel. Each needs to be individually constructed and selected according to the installation requirements of each tower.

In particular, the pole spacing supports 12, 14 need to ensure a minimum spacing of the installed antenna from the tower structural elements, other installed equipment on the tower-top while at the same time keeping the first Fresnel zone free of obstacles. This spacing must be decided ad-hoc (i.e. on a "per site" basis) since the full inventory of the existing tower-top equipment as well as the distance, dimensions and exact locations of this equipment on the tower are in most of the cases unknown and/or not documented. To relieve the burden (specifically site visits and related "autopsies") of "per site" decisions, as well as to safeguard future tower-top equipment modernization and upgrades, the pole spacing supports 12, 14 are almost always over-dimensioned. Over-dimensioning of the pole spacing supports 12, 14 means that the elongate metal tubes 16, 18 are made of greater length and higher structural integrity to satisfy longer spacing from the mast than required. In other words, they are typically over-engineered.

The larger elongate metal tubes 16, 18 used for longer spacing add considerable system volume, weight and wind-load to the mast and specifically at the tower-top, leading to degraded tower capacity capabilities.

Pole spacing supports 12, 14 and in particular the elongate metal tubes 16, 18 are welded on both the mast clamps 30 on the mast side and on the pole clamps 20 on the pole side. Mast clamps need to be tightly secured on the upright members 4, while pole clamps 20 need to be tightly secured on the pole 20. Poles 22 used for the purpose are generally common and are purchased off-the-shelf. However, in order to safeguard future antenna modernization and upgrades (larger, longer and heavier antennas), the poles selected are always over-dimensioned. Usual poles used are ø 60 mm×4 mm or ø89 mm×3.6 mm, with length L=3 m. These poles can be used for antennas of up to 2.7 m height and are deployed even for the cases that a 1.3 m antenna is used). The poles weigh 16.56 kg and 22.74 kg respectively.

The larger poles 22 can be used to accommodate larger, longer and heavier antennas in the future, but they add considerable system volume, weight and wind-load to the mast and specifically at the tower-top, leading to degraded tower capacity capabilities.

Depending on the antenna type selected, different poles are used, thus different pole clamps 20 are required. This requires the pole clamps 20 to be custom made and welded to the elongate metal tubes 16, 18. The same applies for the mast clamps 30. However, since the mast clamps 30 need to confirm to the tower's structural elements, i.e. poles (such as 060 mm, 090 mm, 0114 mm according to BS 10296 standard), equal angle sections (such as 100 mm×100 mm×8 mm, 140 mm×140 mm×12 mm according to BS 10056 standard), hollow sections (such as 60 mm×60 mm×4 mm, 80 mm×80 mm×6 mm according to BS 10219 standard) and the like, mast clamps are a more complicated case. It is a requirement to know the type and size of the upright members 4 before the mast clamps 30 can be made and installed.

Therefore the necessary customization of both the mast and pole clamps 30, 20 adds burden and delays on the antenna roll-out.

Tower structural elements such as walls, chimneys, water towers and the like are also included.

Both the pole 22 and the pole spacing supports 12, 14 add considerable weight and wind-load to the mast and specifically at the tower-top. A typical legacy antenna support system weights 60 kg (i.e. for a typical 3 sector installation 180 kgs in total) while it adds an unnecessary (considerable compared to the antenna) effective projected area (EPA) to the antenna system. Considering the dynamic and static stresses that are applied to the mast base legs, the extra weight negatively impacts the mean time between failure (MTBF) of the tower itself—not to mention that on marginal static cases (especially when RAN technology network upgrades are needed), expensive mast reinforcements are also required.

Due to weight, the legacy antenna "support" also presents a negative environmental footprint (caused by the unnecessary galvanized steel deployed for antenna mounting). This unnecessary weight directly translates into increased $CO_2$ emissions into the environment. 5G technology itself is characterized by high energy consumption and there is a need for mobile network operators to reduce their environmental footprint.

Secondly, the legacy antenna "support" system installation is complex, as it needs to take place in three discrete phases:
 1. The first phase requires the antenna "support" system to be installed on the mast's vertical upright members 4;
 2. the second phase requires the antenna and its azimuth 27, 29 and tilt brackets 26, 28 to be installed on the antenna "support" (and specifically on pole 22); and,
 3. the third phase requires the antenna azimuth and tilt alignment to be performed on the spot.

This is clearly undesirable due to the large amount of time it takes the riggers to perform such an installation. Longer times of specialized personnel (like riggers) on the tower-top, negatively impacts installation costs, revenues (increased site-down-time) and has health and safety at work implications.

Thirdly, although the main reason that the engineering and design of the legacy universal antenna "support" system is the antenna alignment capability it provides (azimuth and tilt), both azimuth and tilt alignment is performed at tower-top with unknown accuracy and precision. Antenna azimuth and tilt alignment is still performed with the use of collars 27, 29 and the tilt bracket 26, 28 which are not calibrated for azimuth and tilt steering (thus presenting systematic errors), operated by a person (rigger) that also adds random errors in the alignment process on top of the systematic errors. Any deviation between the actual vs the instructed antenna positioning on the mast is clearly undesirable as it may impact coverage, capacity and quality of cell-site wireless connections.

Fourthly, prior art installations typically have a large antenna effective area (AEA). The AEA is the total swept area of the antenna about the azimuth steering axis. The minimum AEA would be achieved if the axis of rotation was positioned at the centre of the antenna profile. In legacy systems, the antenna is offset from the azimuth axis of rotation (which is coincident with the centre of the pole), and therefore legacy antennas have a large AEA. It is generally beneficial to reduce the AEA as it reduces the volume of the antenna system required at the tower top. Reducing the antenna system volume is advantageous for tower capacity i.e. the capability of the tower to host more antennas and antenna near products on its top. This is of extreme importance for tower companies that need to increase the 'tenancy ratio' on their towers.

Due to the weight and wind-load issues, the longer times required to perform the installation as well as the azimuth and tilt alignment unknown errors caused by the legacy antenna "support" installation process, this solution presents an unjustified high total cost of ownership (TCO). Analysing the actual TCO of the legacy solution, we may sum-up the following:
 a) increased costs for site installation (longer rigging time on tower-top);
 b) increased costs for site reinforcements (higher dynamic and static stresses);
 c) reduced revenues due to high site-down-time (longer rigging time on tower-top);
 d) reduced airtime revenues for the antenna owner due to erroneous antenna alignment (resulting in degraded coverage, capacity and quality of cell-site wireless connections);
 e) reduced asset revenues for the tower owner due to reduced tower capacity (resulting from the reduced 'tenancy ratio');
 f) increased logistics cost (higher warehousing and transportation needs);
 g) reduced traceability of equipment and material installed at tower-top ("bits and pieces");
 h) increased costs due to decreased depreciation of towers and masts (lesser MTBF); and,
 i) increased manufacturing costs (more material, machining and waste).

From total cost of ownership (TCO) perspective it is desirable to improve some or all of the above.

From a structural perspective it is desirable to:
a) minimise the dynamic stress and static load effect on the structural part due to excessive, unnecessary weight of legacy antenna mountings, at tower-top; and,
b) minimize the higher effective projective area (EPA) of the antenna system (antenna and antenna bracket) that causes increased wind loading on the tower.

This problem is clearly faced when additional antennas and tower-top equipment needs to be installed on existing masts, particularly for i.e. 5G technology upgrades.

From an environmental perspective it is desirable to:
a) minimise the utilization of unnecessary galvanized steel, where this directly translates into increased $CO_2$ emissions to the environment.

From a radio planning perspective it is desirable to:
a) accurately align the installed antennas; and,
b) accurately re-align the antennas for optimization purposes.

From a health and safety perspective it is desirable to:
a) minimize tower-top working hours for rigging and climbing crews when installing the antennas;
b) minimize tower-top working hours for rigging and climbing crews when aligning the antennas for the first time; and,
c) minimize tower-top working hours for rigging and climbing crews when re-aligning the antennas for network optimization purposes.

The aim of the present invention is to facilitate a quick and easy, lightweight, safer, environmentally friendly mounting of generally heavy and aerodynamically inefficient modern cellular antennas at the top of masts, whilst providing traceable equipment that presents the same or greater functionality as legacy systems.

A prior antenna mounting bracket is disclosed in U.S. Pat. No. 9,437,918. US'918 discloses a bracket with adjustable azimuth settings coupled to a "support structure". The bracket has a pivot rod about which a moveable bracket assembly is rotatable via a gearbox. The moveable bracket assembly can be locked with locking pins. The document discloses that the backplate of the bracket may be attached to a platform associated with a base station tower. The need for such a "platform" (akin to the support structure of the prior art) and the provision of a single bracket that spans the entire height of the antenna demonstrates that this particular device exhibits all of the aforementioned problems with the prior art.

BRIEF SUMMARY OF THE INVENTION

According to a first aspect of the invention there is provided an antenna support system comprising: a mast comprising an integral mast member;
a first mast member clamp comprising a first steering unit;
a second mast member clamp comprising a second steering unit;
an antenna;
wherein the first and second mast member clamps are independent of each other and each clamped to the mast member at spaced-apart positions, such that the only load paths between the steering units are the mast member and the antenna.
Preferably each mast member clamp comprises:
a universal clamp plate; and,
at least one adaptor component configured to adapt the universal clamp plate to engage the mast member cross-sectional profile.

Preferably the universal clamp plate is an extruded component.

Preferably the universal clamp plate has at least two sets of fastener openings for receiving mechanical fasteners. In a first configuration (clamped to a first mast member profile) a first set of openings are used to secure a first set of components for adapting the universal clamp plate to form a first clamp.

In the first configuration a second set of openings are either not used or partially not used. In a second configuration (clamped to a second mast member profile) the second set of openings are used to secure a second set of components for adapting the universal clamp plate to form a second clamp. In the second configuration the first set of openings are either not used or partially not used.

Preferably the mast member has a circular cross-section, and wherein the adaptor component is configured to engage the circular cross section.

Preferably the pole clamp plate comprises a base attached to the universal clamp plate, and two opposing arms providing a "U" shape section with the free ends of the arms engaging the mast member.

Preferably there is provided a third universal clamp plate, wherein the first second and third universal clamp plates are joined in a loop to clamp the mast section in the centre of the loop.

Preferably the mast member has an angle cross-section, and wherein the adaptor component is configured to engage the angle cross-section.

Preferably each mast member clamp comprises at last two universal clamp plates joined by the adaptor component, wherein the adaptor component is configured to hold the at last two universal clamp plates at an angle to each other being the same as the section angle.

According to a second aspect of the invention there is an antenna support system comprising:
a universal clamp kit having:
a first and a second universal clamp plate;
a first set of components for adapting the universal clamp plates to form a first clamp to clamp a first shape of antenna mast section; and,
a second set of components for adapting the universal clamp plates to form a second clamp to clamp a second shape of antenna mast section; and,
an azimuth steering unit configured for attachment to the first universal clamp plate.

Advantageously, the use of a mast clamp and steering unit is less bulky and heavy than the prior art pole spacing support and pole arrangement. The provision of a universal mast clamp in combination with an azimuth steering unit allows the reduction of the antenna system effective projected area and wind loading moment. The present invention facilitates movement of the antenna closer to the mast, which is beneficial in mitigating among others the static, dynamic as well as tower capacity problems with the prior art.

Furthermore, the present invention allows the provision of a traceable kit suitable for installation on at least two different mast member cross sections. This is advantageous as it mitigates the need for each mast assembly to be customised to the mast section upon manufacture. The installer can carry a suitable kit and know that installation will be possible, irrespective of the mast member shape and size. After installation completion the antenna and/or tower owner will be able to trace the kit installed on the respective tower.

In one embodiment the universal clamp plate is an extruded component. This is advantageous, such components can be manufactured quickly and easily, and lightweight metals such as aluminium or reinforced thermoplastic composites such as glass (GFRP) or carbon fibre (CFRP) lend themselves to extrusion. Furthermore, the extruded universal clamp plate can be cut at different sizes and depths, as such to match different standards like EUROCODES and TIA for different vertical and horizontal clamp plate loadings avoiding over-dimensioning when unnecessary. Further, the openings required for attachment of mechanical fasteners can be formed with the plate, reducing the need for expensive and wasteful machining operations.

Preferably the first and second shapes of antenna mast section are selected from: a square section, a planar section, an angle section and a circular section.

Preferably at least one of the first and second shapes is a circular section, and wherein at least one of the first and second set of components comprises a pole clamp plate configured to engage a circular section pole.

Preferably the pole clamp plate comprises a base attached to the clamp plate, and two opposing arms providing a "U" shape section with the free ends of the arms engaging the antenna mast section.

Preferably a third universal clamp plate is provided, in which the first second and third universal clamp plates are joined in a loop to clamp the mast section in the centre of the loop.

Preferably 'N' (where N>1) universal clamp plates can be provided, in which the first, second . . . Nth universal clamp plates are joined in a loop to clamp the mast section in the centre of the loop.

Preferably at least two clamp bolts are provided, each clamp bolt extending between two universal clamp plates to apply a compressive clamping force to clamp the antenna mast section.

Preferably the least two clamp bolts are joint together through an extruded component that for 2 clamp plates is flat, for three clamp plates extends over a 60 degree angle, for four clamp plates a 45 degree angle, for six clamp plates 30 degrees and so on. The number of clamp plates can be selected depending on the application.

Preferably at least the first clamp engages with the first shape of antenna mast section such that the first clamp cannot be rotated relative to the first shape of antenna mast section.

Preferably the first universal clamp plate is attachable to a wall.

Preferably the azimuth steering unit comprises a housing containing a rotational joint. The rotational joint may comprise a rolling element bearing or bushing. The azimuth steering unit preferably comprises a locking mechanism configured to mechanically lock the steering unit at a predetermined angle, or preferably at a plurality of discrete predetermined angles. Preferably the locking mechanism comprises a locking plate and a locking member engageable with the locking plate to thereby lock the steering unit. For example, the locking plate may comprise a plurality of openings or a ratchet and pawl mechanism to facilitate locking. The unit may be the same as or similar to the applicant's steering and locking unit disclosed in WO2013/171291 or WO 2019/110697.

The azimuth steering unit locking mechanism may comprise a locking antenna and or tilt adaptor and a locking rotational joint member configured to support an antenna in position by virtue of mechanical friction.

Preferably the first and second clamps are configured to support an antenna by virtue of mechanical friction with the first or second shapes of mast sections respectively.

According to a third aspect there is provided a method of configuring an antenna support system comprising the steps of:
providing:
a first and a second universal clamp plate;
a first set of components for adapting the universal clamp plates to form a first clamp to clamp a first shape of antenna mast section; and,
a second set of components for adapting the universal clamp plates to form a second clamp to clamp a second shape of antenna mast section;
selecting one of the first and second sets of components based on a desired shape of antenna mast section.

The supplier can keep an inventory comprising universal clamp plates and component sets. When an order arrives for a specific installation (i.e. specifying the mast cross section to be used), the supplier can quickly and easily select the relevant component set and send them to the customer with the universal clamp plates, thus forming a complete antenna installation solution. This approach offers high variability in the product offering without the prior art drawbacks of customised manufacture.

Preferably the method comprises the steps of:
receiving a clamp kit request comprising the desired shape of antenna mast section; and,
packaging and supplying the first universal clamp plate, second universal clamp plate and the selected set of components based on the clamp kit request.

According to a fourth aspect there is provided a method of installing an antenna support system comprising the steps of:
providing a universal clamp kit having:
a first and a second universal clamp plate;
a first set of components for adapting the universal clamp plates to form a first clamp to clamp a first shape of antenna mast section; and,
a second set of components for adapting the universal clamp plates to form a second clamp to clamp a second shape of antenna mast section; and,
providing an azimuth steering unit;
selecting one of the first and second sets of components;
assembling the first or second clamp dependent upon the selected set of components;
attaching the azimuth steering unit to one of the first and second universal clamp plates;
clamping a mast member with the first or second clamp; and,
attaching a cellular antenna to the azimuth steering unit.

According to a fifth aspect there is provided a method of modifying an assembly of a mast and cellular antenna, the assembly comprising:
an antenna mast comprising a mast member;
a support bracket attached to the mast member at a first end, and to a pole at a second end;
a first antenna attached to the pole so as to be rotatable with respect to the pole in at least one of a vertical and horizontal axis;
the method comprising the steps of:
removing the support bracket and the antenna from the mast;
providing a mast clamp configured to clamp the mast member between at least a first and second part of the mast clamp;
providing an azimuth steering unit;

attaching the steering unit to the mast clamp;
clamping the mast member with the mast clamp; and
attaching one of the first antenna and a second antenna to the azimuth steering unit.

Preferably the method comprises the steps of:
assembling the one of the first antenna and a second antenna, azimuth steering unit and mast clamp before clamping the mast member with the mast clamp.

Preferably the method comprises the steps of:
locking the steering unit before clamping the mast member with the mast clamp.

Preferably the method comprises the steps of:
measuring the orientation of the mast member;
identifying a desired antenna heading;
calculating the required azimuth steering angle of the steering unit to achieve the desired antenna heading;
locking the steering unit at the required azimuth steering angle before clamping the mast member with the mast clamp.

Preferably the step of locking takes place before a step of elevating the antenna to the required height.

Preferably the assembly comprises two spaced-apart support brackets, and wherein the pole extends between the support brackets.

Preferably the method comprises:
providing two mast clamps;
providing two azimuth steering units, attached to respective mast clamps;
attaching the first or a second antenna to the mast at two spaced apart positions using the two mast clamps such that the azimuth steering axes of the steering units are aligned.

Advantageously, the symmetry of the steering unit fixing holes 120, along with the symmetry of the azimuth steering unit locking plate 104, ensures that the installed antenna will be tightly secured, collinearly on the mast's vertical structural member, as such the antenna reflector/backplane cannot be twisted when clamped on the mast.

In a preferred embodiment, the "reference frame" method described in the applicant's earlier application WO2013/171291 is combined with the present invention. The mast member forms the reference frame.

BRIEF DESCRIPTION OF THE SEVERAL VIEWS OF THE DRAWINGS

Example antenna mounting apparatuses according to the invention will now be described with reference to the drawings in which.

DETAILED DESCRIPTION OF THE INVENTION

Figure 2A:
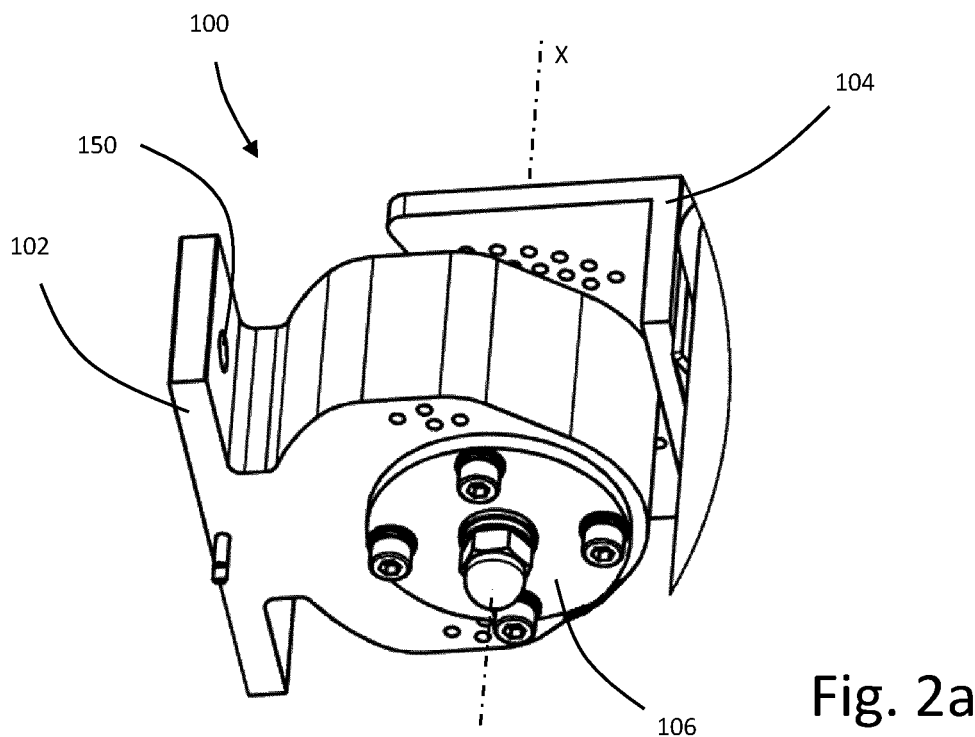
FIGS. 2a and 2b are perspective views of a steering and locking unit for use with the present invention.
Figure 2B:
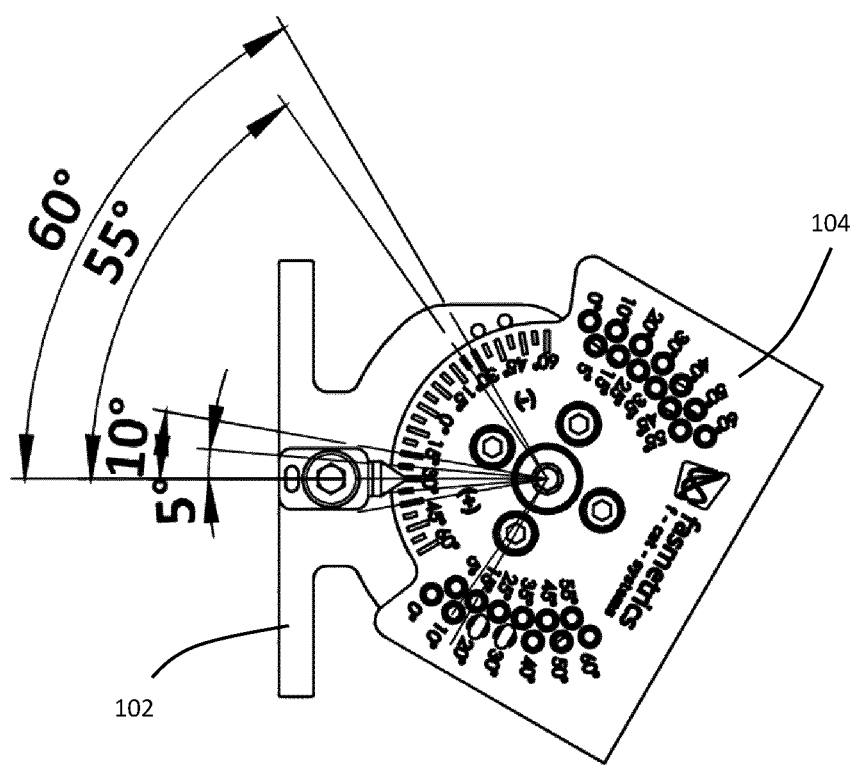

Referring to FIGS. 2a and 2b, a steering and locking unit 100 for use with the present invention is shown. The unit is described in detail in the applicant's co-pending application published as WO2019/110697 (incorporated by reference where possible). Broadly speaking, the unit 100 comprises a mast-side portion 102, an antenna-side portion and a rotational joint 106 therebetween enabling the two portions 102, 104 to be rotated relative to one another about an azimuth steering axis X. The mast-side portion has a pair of spaced-apart fixing holes 150. Each of the embodiments discussed below is concerned with mounting the steering and locking unit 100 such that azimuth steering and locking of the antenna relative to a fixed structure (e.g. a mast or wall) is possible.

First Embodiment

According to the first embodiment of the present invention, there are five brackets for attaching the steering and locking unit 100 (and therefore an antenna) to a range of structures. The different types of brackets are:
- H-type bracket 200—for attachment to square sections (FIGS. 7*a* and 7*b*);
- E-type bracket 300—for attachment to angle sections (FIGS. 8*a* and 8*b*);
- J-type bracket 400—for attachment to circular sections (FIGS. 9*a* and 8*b*);
- P-type bracket 500—for attachment to circular sections (FIGS. 10*a* and 10*b*);
- W-type bracket 600—for attachment to walls (FIGS. 11*a* and 11*b*).

The brackets form part of an antenna mounting kit or system, comprising various components common to one or more of the brackets. These components are:
- Bracket plate 108—used in all types of bracket;
- Back plate 110—used in types H, E, P;
- Pole clamp plate 112—used in types J, P;
- Angle section 114—used in types H, J.

Other components are used in each bracket type, but tend to be unique to that bracket. Therefore the kit or system is modular—the common parts of the kit can be combined in different ways to attach antennas to different types of structure.

Each bracket H, E, J, P is essentially an adaptor to clamp the relevant section of the structure and present a face for attachment of the steering and locking unit 100. The clamps do not rely on drilling holes or openings in the underlying structure (with the exception of the W-type bracket for walls).

Bracket Plate 108

Figure 3:
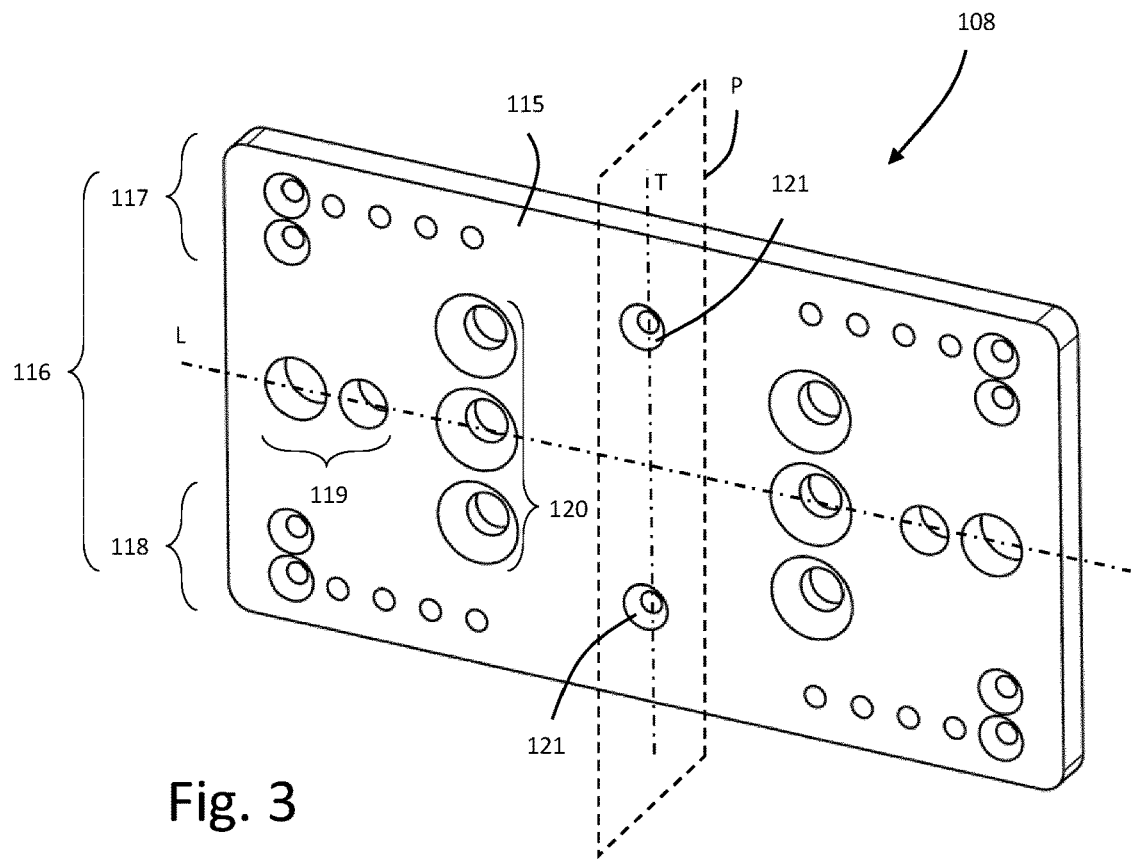
FIG. 3 is a first modular component in accordance with a first embodiment of the present invention.

Referring to FIG. 3, the bracket plate 108 is a flat, rectangular plate 115 comprising a plurality of circular through-bores as described below.

The plate 108 is symmetrical about a plane of symmetry P, coincident with a transverse axis T and normal to a long axis L. Each side has a plurality of fixing holes 116 divided into a first set 117 and a second set 118. Each set 117, 118 is in an "L" shape nested in a corner of the plate 115. A pair of clamping holes 119 are provided on each side of the plate 108, aligned along the plate's long axis L. Three steering unit fixing holes 120 are provided in a line parallel to, and offset from the transverse axis T. A pair of pole clamp plate fixing holes 121 are provided spaced along the transverse axis T.

Back Plate 110

Figure 4:
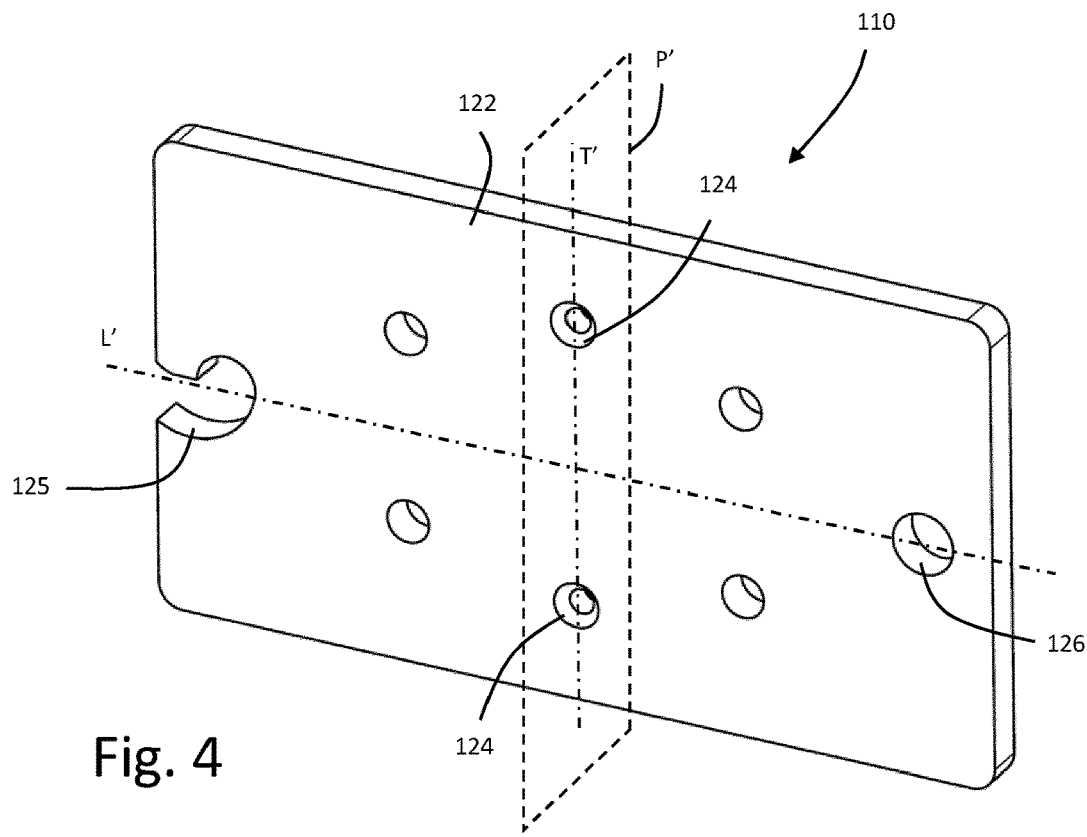
FIG. 4 is a second modular component in accordance with the first embodiment of the present invention.

Referring to FIG. 4, the back plate 110 is a flat, rectangular plate 122. The plate is generally symmetrical about a plane of symmetry P', coincident with a transverse axis T' and normal to a long axis L'.

A pair of pole clamp plate fixing holes 124 are provided spaced along the transverse axis T.

On one side of the plate 110, a curved open slot 125 is provided, extending from the periphery. On the opposite side a clamping hole 126 is provided.

Pole or Circular Section Clamp Plate 112

Figure 5:
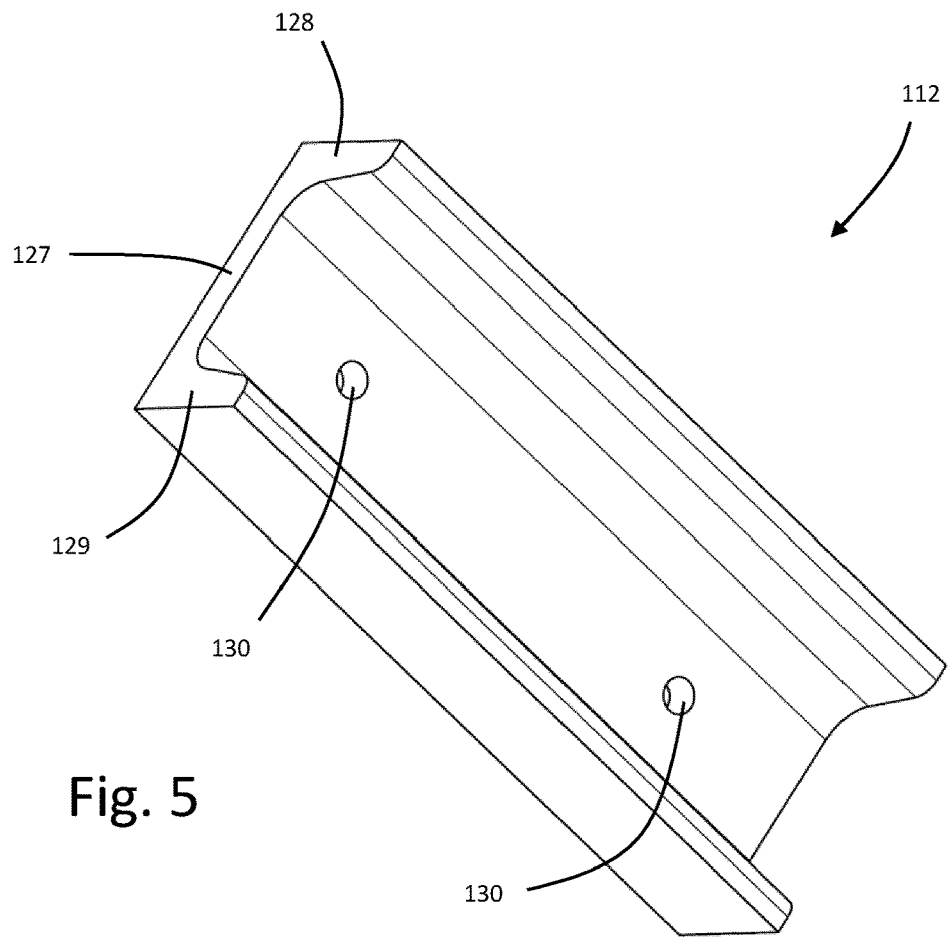
FIG. 5 is a third modular component in accordance with the first embodiment of the present invention.
Figure 6:
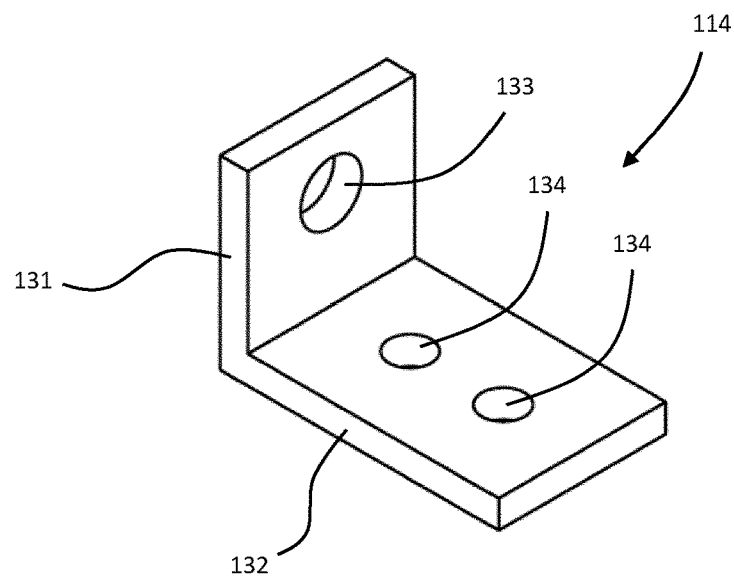
FIG. 6 is a fourth modular component in accordance with the first embodiment of the present invention.

The pole clamp plate 112 shown in FIG. 5 is an elongate, prismatic component. The cross-section of the plate 112 has a base 127 and two opposing arms 128, 129 providing a "U" shape. At two spaced-apart positions on the base, spaced along the longitudinal axis of the plate, there are provided two fixing holes 130.

Advantageously, the pole clamp plate 112 can be a "plug-n-play" component to the bracket plate 108 and the Back plate 110. Using the pole clamp plate 112 colinearly with a pole, it is ensured that the selected clamp configuration has the required surface contact with the pole so as the friction generated between the pole clamp plate and the pole is adequate to support both the weight and the wind loading of the installed antenna after installation on the mast.

It will be noted that the contact surface area of the pole clamp plate 112 is at least ten times more than that of the prior art collar 27, 29 found on the legacy antenna "support" system, ensuring that the novel support system can withstand higher weight and wind-load than the legacy solutions.

Angle Section 114

The angle section 114 comprises a first portion 131 and a second portion 132 at right angles to each other. The first portion 131 comprises a bore 133, and the second portion two spaced apart bores 134, one close to the first portion than the other.

Advantageously, the angle section 114 can be a "plug-n-play" component with the bracket plate 108 in order to form the H-type bracket 200 and the J-type bracket 400 (described below). At the H-type bracket 200 configuration on the second portion 132 the two spaced apart bores 134 can be fixed in pairs on the bore set 117 and the bore set 118 of the bracket plate 108 (2×angle section 114 components are needed).

H-Type Bracket 200

Figure 7A:
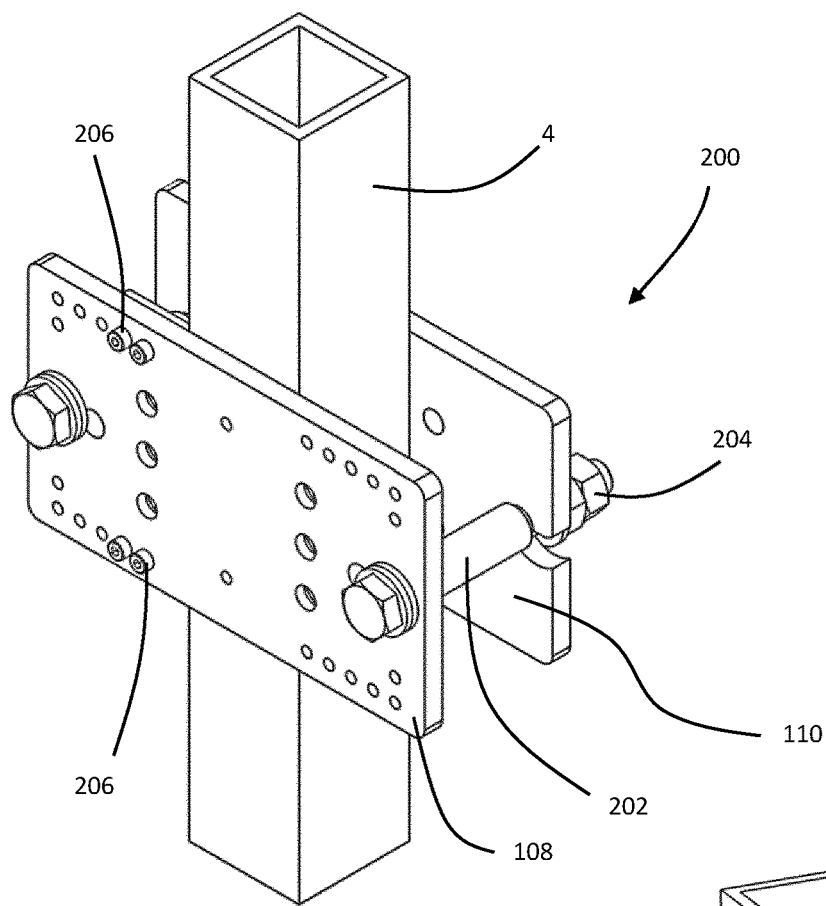
FIGS. 7a and 7b are perspective views of a first antenna mounting bracket in accordance with the first embodiment of the present invention.
Figure 7B:
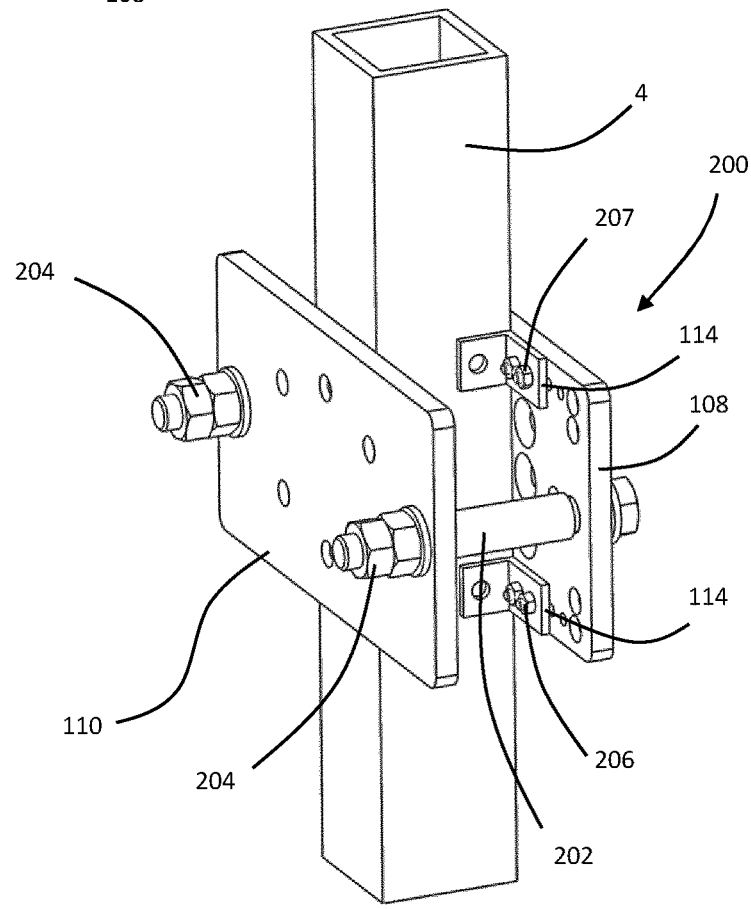

The H-type bracket assembly shown in FIGS. 7*a* and 7*b* comprises a bracket plate 108, a back plate 110, two angle sections 114, two clamp bolts 202 (with locking nuts 204) and several screws 206 with nuts 207.

Figure 1:
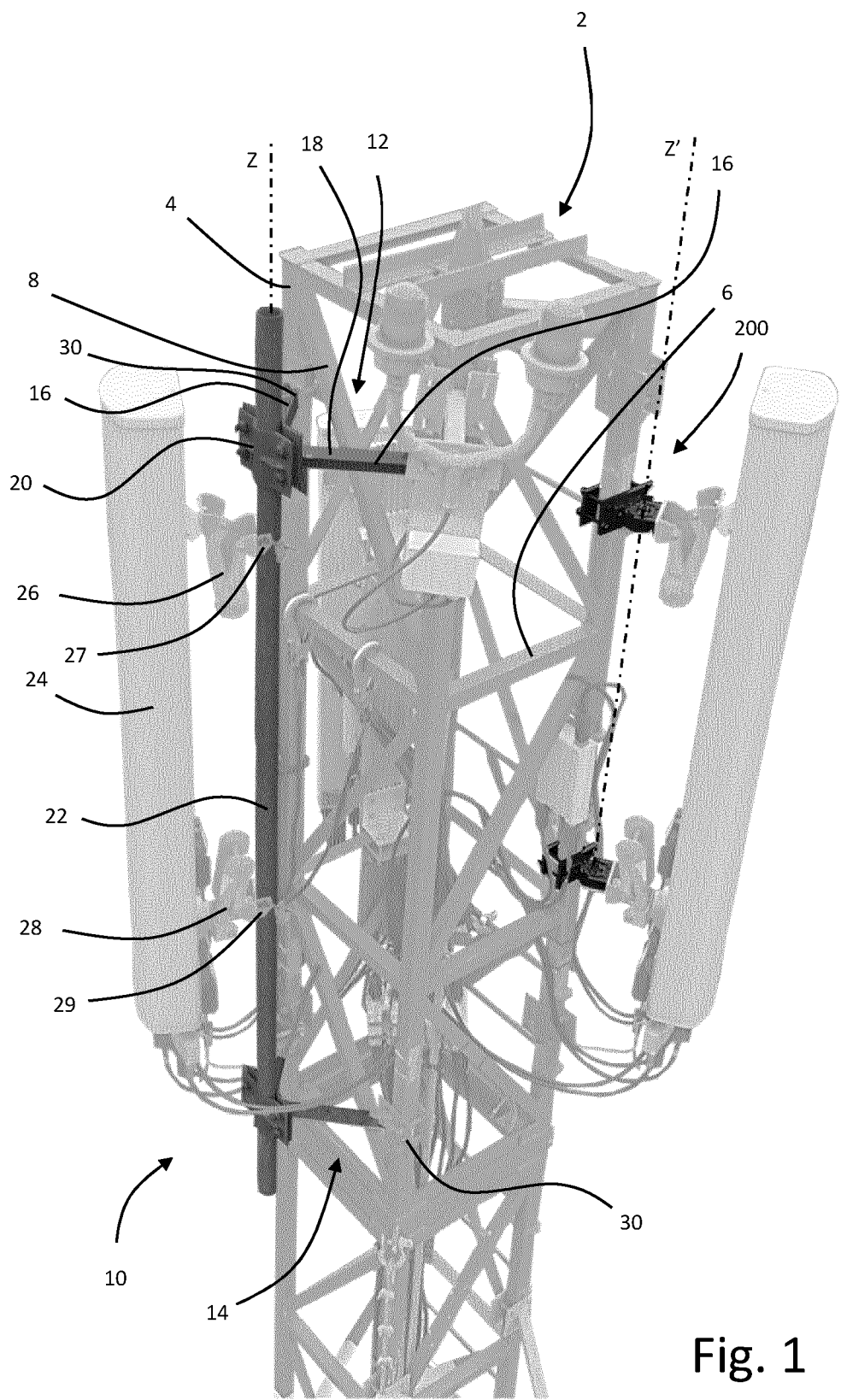
FIG. 1 is a perspective view of a prior art antenna mounting system; and an antenna mounting system according to the invention on the same mast.

The H-type bracket is used for square section mast members, such as upright member 4 in FIG. 1. The square section mast member in FIGS. 7*a* and 7*b* is also labelled 4, and referring to the right hand side of FIG. 1 is shown installed on the mast 2.

The angle sections 114 are attached to the bracket plate 108 with screws 206 passing through the bores 134 and fixing holes 116 in the first set 117. They are secured with nuts. The angle sections 114 are then attached to the member 4 in order to align the bracket plate 108 on the mast's vertical structural member and ensure the symmetry of the steering unit fixing holes 120, along with the symmetry of the azimuth steering unit locking plate 104. In this way, the installed antenna can be tightly secured, collinearly on the mast's vertical structural member, as such the antenna reflector/backplane cannot be twisted when clamped on the mast.

The back plate 110 is positioned on an opposite side of the member 4 to the bracket plate 108. A first clamping bolt 202 is fed through a clamping hole 119 of the bracket plate and the aligned clamping hole 126 of the back plate. A second clamping bolt 202 is fed through a second clamping hole 119 of the bracket plate and the aligned clamping slot 125 of the back plate. The locking nuts 204 are used to tension the bolts 202 and thereby produce a clamping force on the member 4 to secure the bracket 200 in position. It will be noted that the attachment of the angle sections 114 to the member 4 is merely for alignment purposes, and is not intended to support any load (this is supported by the clamping force/friction of the bracket 200.

The steering and locking unit 100 is attached to the bracket plate 108 by securing fasteners through the spaced-apart fixing holes 150 of the unit 100 and the steering unit fixing holes 120. It should be noted that the attachment of the unit 100 to the plate 108 takes place before the plate 108 is assembled with the rest of the bracket 200 to clamp the member 4. The horizontal length of the azimuth steering and locking unit 100 enables the position of the antenna to be offset the mast. As such, an antenna of around three meter height and half a meter width can be placed spaced apart from the mast section on the horizontal plane in order to achieve azimuth steering of 120° range and tilt inclination of 20° range (up-tilt or down-tilt) without clashing on the mast structural members.

In this way the novel antenna support system of the present invention is simple and fast, and can take place in one discrete phase. In this single installation phase the new antenna support system (H-type bracket configuration) is installed on the antenna along with its azimuth steering units 100 and tilt brackets 26, 28 on the ground.

Because of the ability of the units 100 to be locked into a predetermined angular orientation, the steering angle can be selected and "locked in" before the assembly is taken up the mast to the appropriate height. Once installed, the antenna azimuth alignment is correct. This is clearly desirable due to the small amount of time it takes the riggers to perform such an installation. Smaller times of specialized personnel (like riggers) on tower-top, positively impacts installation costs, revenues (decreased site-down-time), health and safety at work.

The idea of alignment with respect to a "reference frame" was introduced in applicant's earlier application WO2013/171291. This idea can be combined with the embodiments described herein to solve some of the above-mentioned problems with the prior art. In particular, the orientation of the mast member can be measured to a high degree of accuracy. The required steering angle can then be determined to achieve the desired antenna heading. The steering angle can be "locked in" using the steering and locking unit on the ground (pre-assembled with the antenna and bracket 200) before installation. Therefore when the rigger installs the antenna by attaching the bracket 200 as described above, the antenna heading will be correct, eliminating any error. The idea of alignment with respect to a "reference frame" as introduced in applicant's earlier application WO2013/171291 is applied to all mounting brackets disclosed in the present invention.

The H-bracket design shown in FIGS. 7a and 7b can be modified to fit a range of sizes of square section members 4. This can be facilitated by positioning the angle section 114 appropriately. For example, for a larger square section than shown in FIGS. 7a and 7b, the angle sections 114 can be attached to the bracket plate 108 at positions further towards the edge—i.e. in a different pair of the holes 117, 118. Therefore, a range of square sections—for example 60×60 mm, 70×70 mm, 80×80 mm can be accommodated.

It should be noted that in the present embodiment, a pair of H-type brackets 200 spaced along the mast with respective azimuth steering units 100 weights less than 10 Kg in total. When replacing the prior art antenna supports 12, 14 and pole 22 the tower-top can be relieved of more than 50 Kgs of unnecessary weight per antenna. This H-type bracket advantage positively impacts the mean time between failure (MTBF) of the tower itself—not to mention that on marginal static cases (especially when RAN technology network upgrades are needed), expensive mast reinforcements can be avoided and $CO_2$ emissions into the environment can be significantly minimized.

E-Type Bracket 300

Figure 8A:
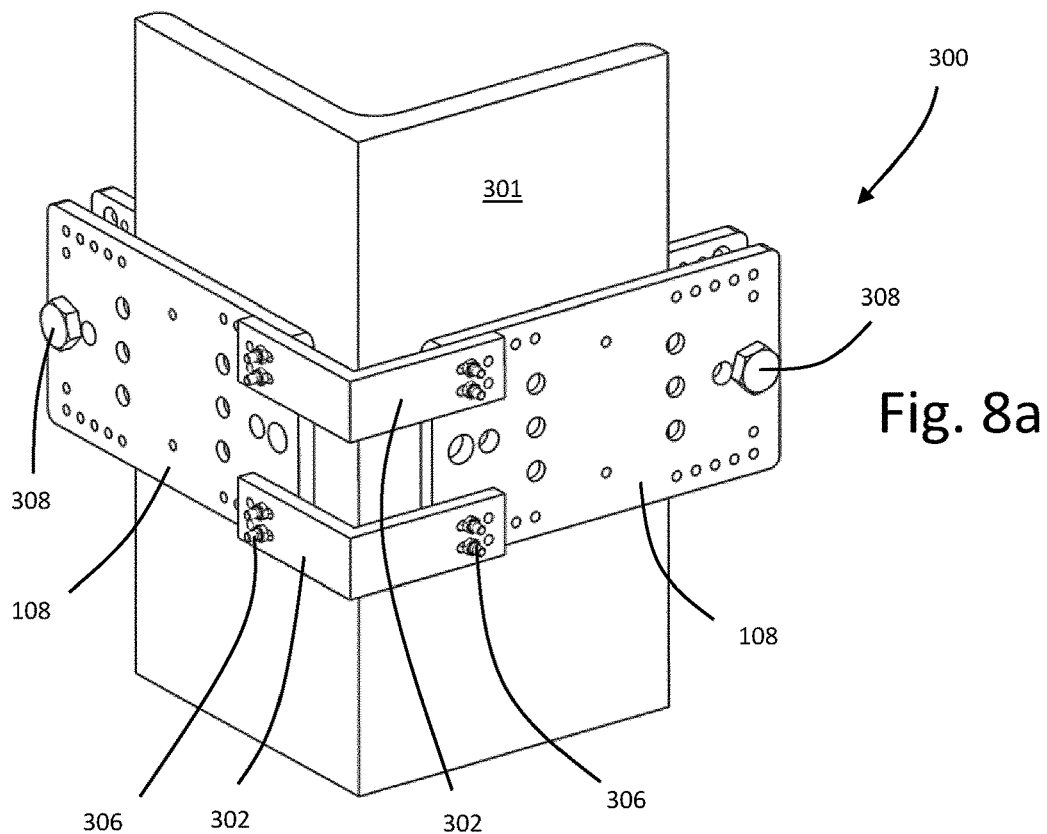
FIGS. 8a and 8b are perspective views of a second antenna mounting bracket in accordance with the first embodiment of the present invention.
Figure 8B:
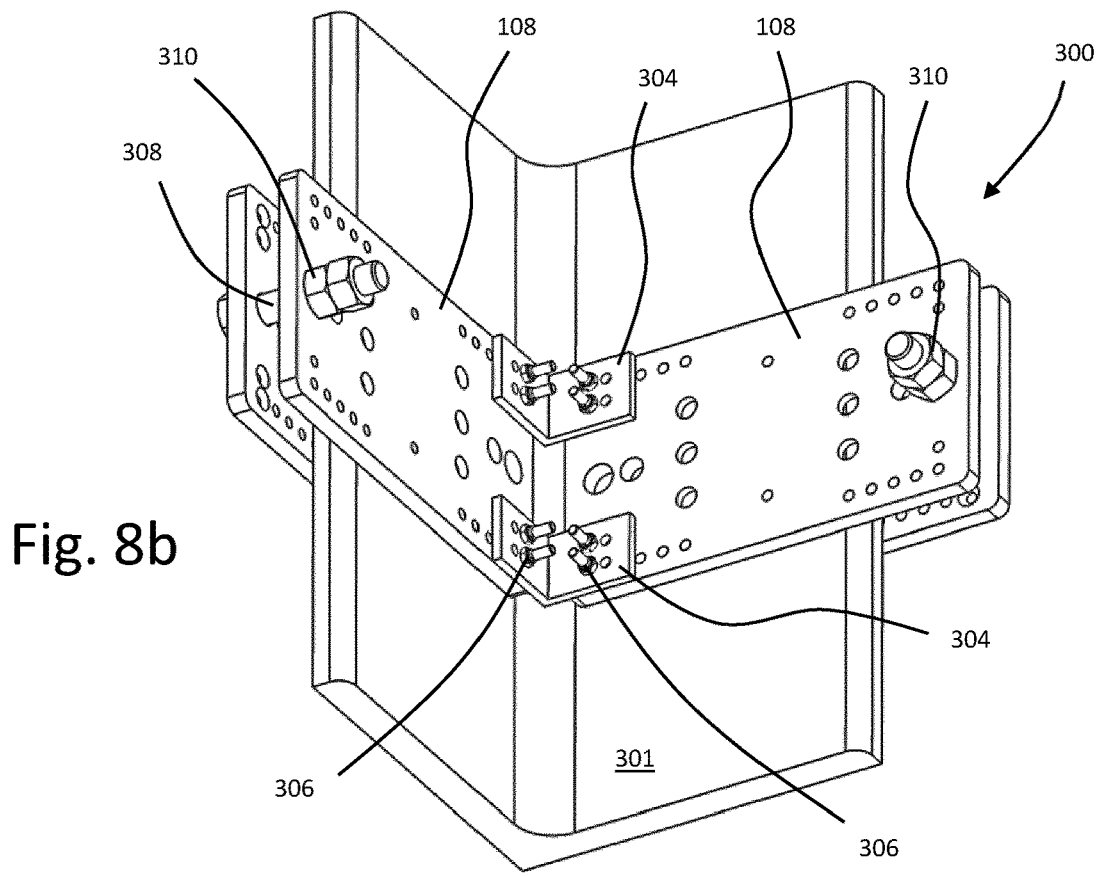

The E-type bracket is used for angle sections such as the member 301 in FIGS. 8a and 8b.

The E-type bracket assembly shown in FIGS. 8a and 8b comprises four bracket plates 108, two outer angle plates 302, two inner angle plates 304, a plurality of attachment screws 306 and two clamping bolts 308 with associated locking nuts 310.

Two of the plates 108 are attached using two spaced-apart outer angle plates 302 (FIG. 8a) using screws 306 through the plates 302 and two of the respective first set 117 and second set 118 of fixing holes 116. This forms an outer L-shaped subassembly.

The other two plates 108 are attached using two spaced-apart inner angle plates 304 (FIG. 8b) using screws 306 through the plates 302 and two of the respective first set 117 and second set 118 of fixing holes 116. This forms an inner L-shaped subassembly.

The inner and outer subassemblies are positioned either side of the member 301 and clamped together with clamping bolts 308 through the outermost clamping holes 119 of the bracket plates to clamp the member 301.

The steering and locking unit 100 can be attached to the outer bracket plates 108 by securing fasteners through the spaced-apart fixing holes 150 of the unit 100 and the steering unit fixing holes 120. It should be noted that the attachment of the unit 100 to the plate 108 takes place before the plate 108 is assembled with the rest of the bracket 300 to clamp the member 301.

The horizontal length of the azimuth steering and locking unit 100 enables the position of the antenna to be offset the mast. As such, an antenna of around three meter height and half a meter width can be placed spaced apart from the mast section on the horizontal plane in order to achieve azimuth steering of 120° range and tilt inclination of 20° range (up-tilt or down-tilt) without clashing on the mast structural members.

In this way the novel antenna support system of the present invention is simple and fast, and can take place in one discrete phase. In this single installation phase the new antenna support system (E-type bracket configuration) is installed on the antenna along with its azimuth steering units 100 and tilt brackets 26, 28 on the ground.

The E-type bracket 300 can be configured to clamp a range of different angle section members 301. In particular the outer angle plates 302 and inner angle plates 304 can be attached to the respective bracket plates 108 via a range of openings of the pluralities of openings provided in those angle plates (each is shown with three pairs of attachment openings).

Some examples of the dimensions of the angle section members that may be accommodated:

140 × 140 × 13 mm
140 × 140 × 15 mm
150 × 150 × 12 mm
150 × 150 × 14 mm
150 × 150 × 15 mm
150 × 150 × 18 mm
160 × 160 × 15 mm
180 × 180 × 16 mm

180 × 180 × 18 mm
200 × 200 × 16 mm

It should also be noted that steering and locking units 100 and antennas can be attached to each of the outer bracket plates 108 simultaneously. This allows two antennas to be attached to each member 301. So, in the event that the mast is triangular in section (three vertical members), it is possible to attach up to six antennas. In the event that the mast is square in section (four vertical members), it is possible to attach up to eight antennas.

Further componentry may be provided to facilitate the attachment of two azimuth steering units per universal plate, and therefore up to sixteen antennas may be provided all side-by-side or eight upper and either lower antennas.

For such a configuration the weight that can be saved from tower-top is over 500 Kgs. Taking into account that more new antennas need to be installed on existing masts with the introduction of i.e. 5G technology and the new frequency spectrum allocations, such weight savings are significant for the improvement of the mast's mean time between failure (MTBF), the reduction of costs involved to mast reinforcements and the environmental benefits the minimized $CO_2$ emissions offer.

J-Type Bracket 400

Figure 9A:
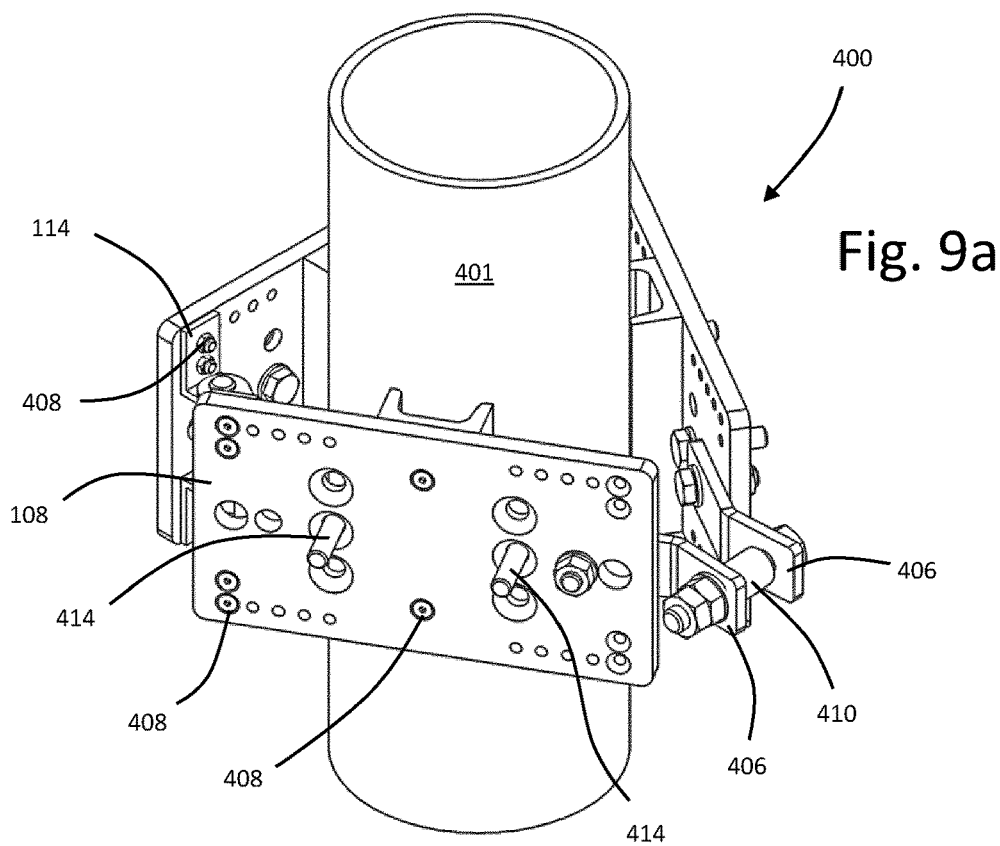
FIGS. 9a to 9c are perspective views of a third antenna mounting bracket in accordance with the first embodiment of the present invention.
Figure 9B:
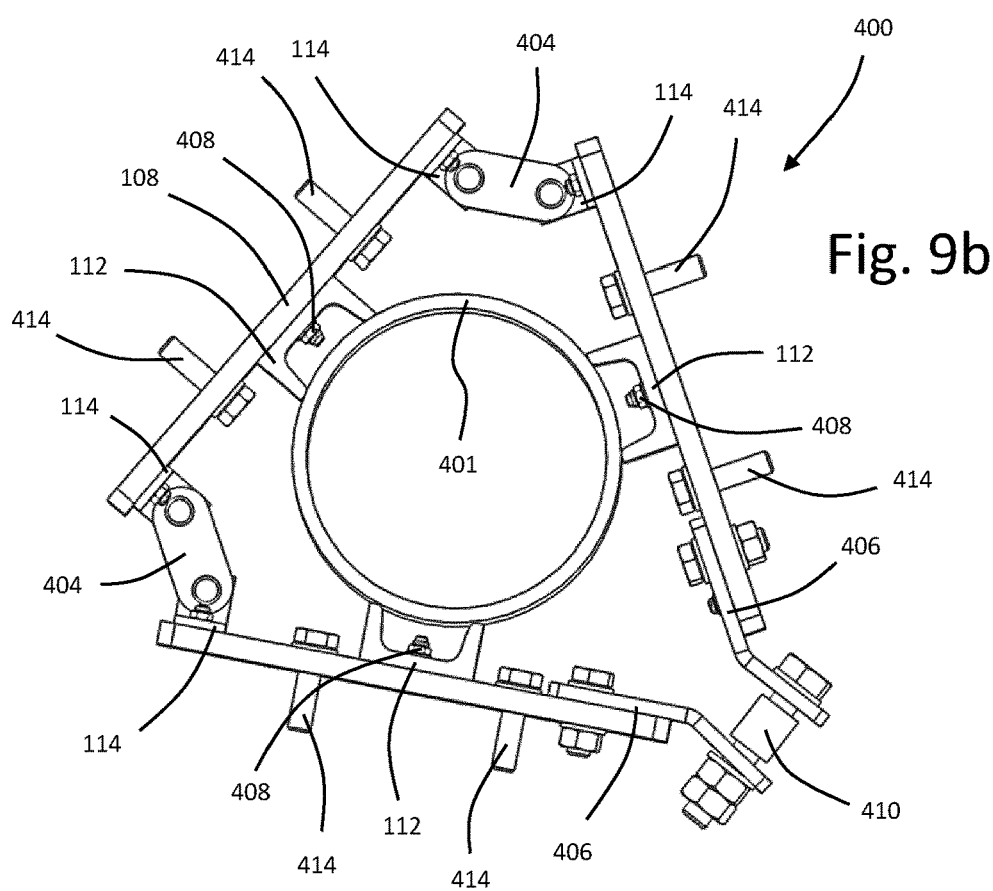
Figure 9C:
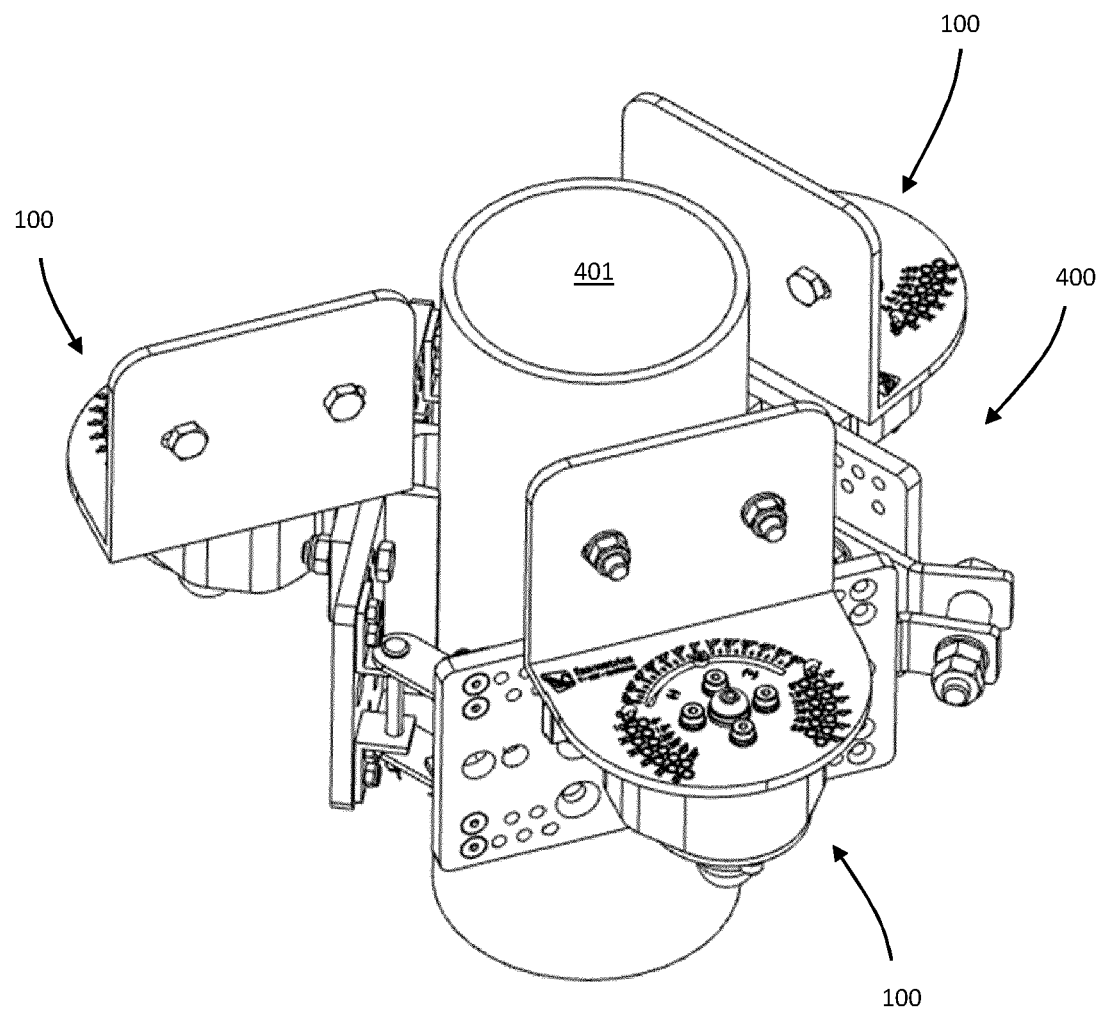

The J-type bracket is used for circular sections such as the member 401 in FIGS. 9a to 9c.

The J-type bracket assembly shown in FIGS. 9a and 9b comprises three bracket plates 108, eight angle sections 114, four links 404, two clamp brackets 406, a plurality of attachment screws 408, a clamping bolt 410 with associated locking nuts 412 and three pole clamp plates 112.

The angle sections 114 are attached to one end of two of the brackets 108, and to both ends of the other bracket 108 with screws 408 using the fixing holes 117, 118. The plates are then attached by connecting the angle sections 114 with the links 404 (two extending between each adjacent bracket 108). The links are articulated such that the plates 108 are rotatable relative to one another.

The clamp brackets 406 are attached to the free ends of the arrangement by attachment to the innermost clamping hole 119.

A pole clamp plate 112 is attached to each of the plates 108 via screws 408 engaging the pole clamp plate fixing holes 121 on the plate 108 and the fixing holes 130 on the plate 112.

The arrangement can then be equally spaced "wrapped" around the pole 401, the clamping bolt 410 inserted through the clamp brackets and the locking nuts 412 used to put the bolt 410 in tension to clamp the bracket 400 to the pole 401.

Advantageously, depending on pole 401 diameter i.e. φ114, φ150, φ200, etc, the links 404 can be provided in various lengths in order to secure the J-type bracket to fit the required pole.

The steering and locking unit 100 can be attached to the outer bracket plates 108 by securing fasteners 414 through the spaced-apart fixing holes 150 of the unit 100 and the steering unit fixing holes 120. It should be noted that the attachment of the unit 100 to the plate 108 takes place before the plate 108 is assembled with the rest of the bracket 400 to clamp the member 401.

Taking into account that usually 3 antennas (for a 3-sector site), half a meter wide and with azimuth range freedom of 120 degrees each are to be installed on the pole, the J-type bracket 400 in conjunction with the azimuth steering unit 100 allows the use of poles of very small diameter. Using such poles for the purpose is not only inexpensive but also practical and straightforward to implement.

It is often desirable to exchange old antennas with more modern antennas (typically larger in size) on monopole rooftop masts. Such base stations are typically covered with camouflage and/or a radome. The J-type bracket deployment according to the invention can make it possible for the same camouflage to be used, instead of having to swap to a larger diameter one. Ordinarily, the external radius of the new antennas combined with the prior art antenna "support" would extend the antenna outer surface radially outwardly. As such it would clash on the (fixed) camouflage. By swapping the prior art antenna "support" for the novel one proposed herein, the external radius of the new antennas is minimised (at the same time offering the required azimuth steering capability). This is highly desirable not only due to the costs involved on such activity, but also to retain the initial aesthetic reasons the camouflage was selected from the beginning.

Special azimuth steering units could be used for the purpose, such as the ones shown on FIG. 9c.

It should be noted that a pair of J-type bracket type 400 spaced along the mast weighs less than 10 Kg in total, such as when comparing to the prior art antenna supports 12, 14 and pole 22 the tower-top can be relieved from more than 170 kgs of unnecessary weight per three antennas installed. This J-type bracket advantage positively impacts the mean time between failure (MTBF) of the pole itself—not to mention that on marginal static cases (especially when RAN technology network upgrades are needed), expensive mast reinforcements can be avoided and $CO_2$ emissions into the environment can be significantly minimized.

P-Type Bracket 500

Figure 10A:
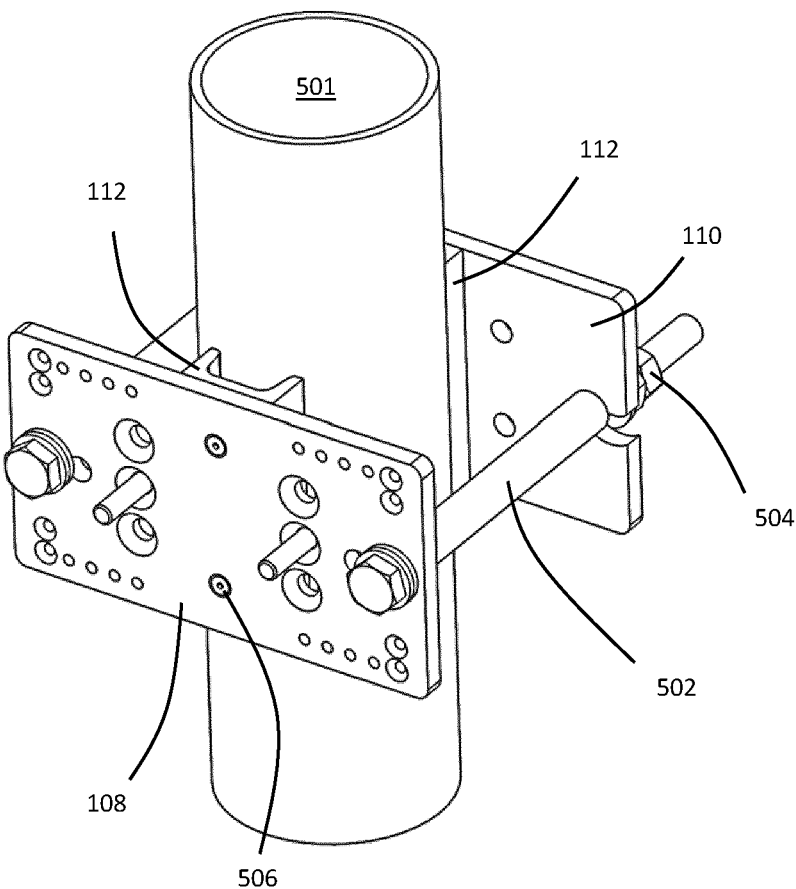
FIGS. 10a and 10c are perspective views of a fourth antenna mounting bracket in accordance with the first embodiment of the present invention.
Figure 10B:
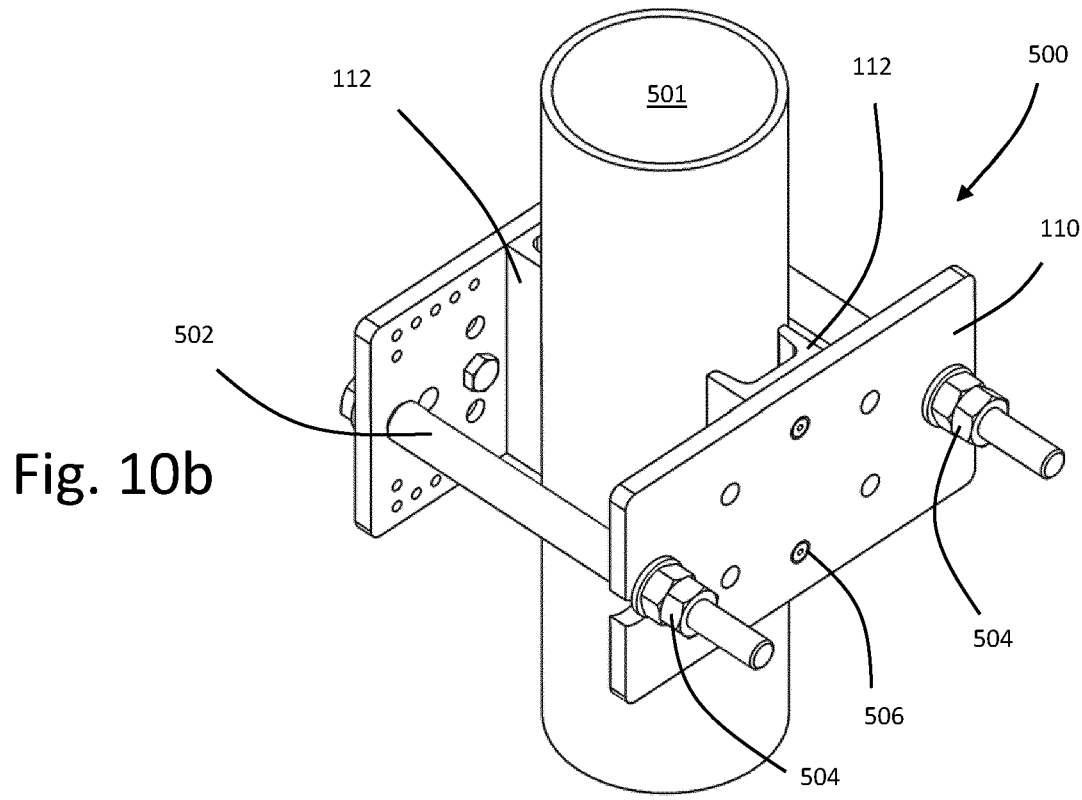
Figure 10C:
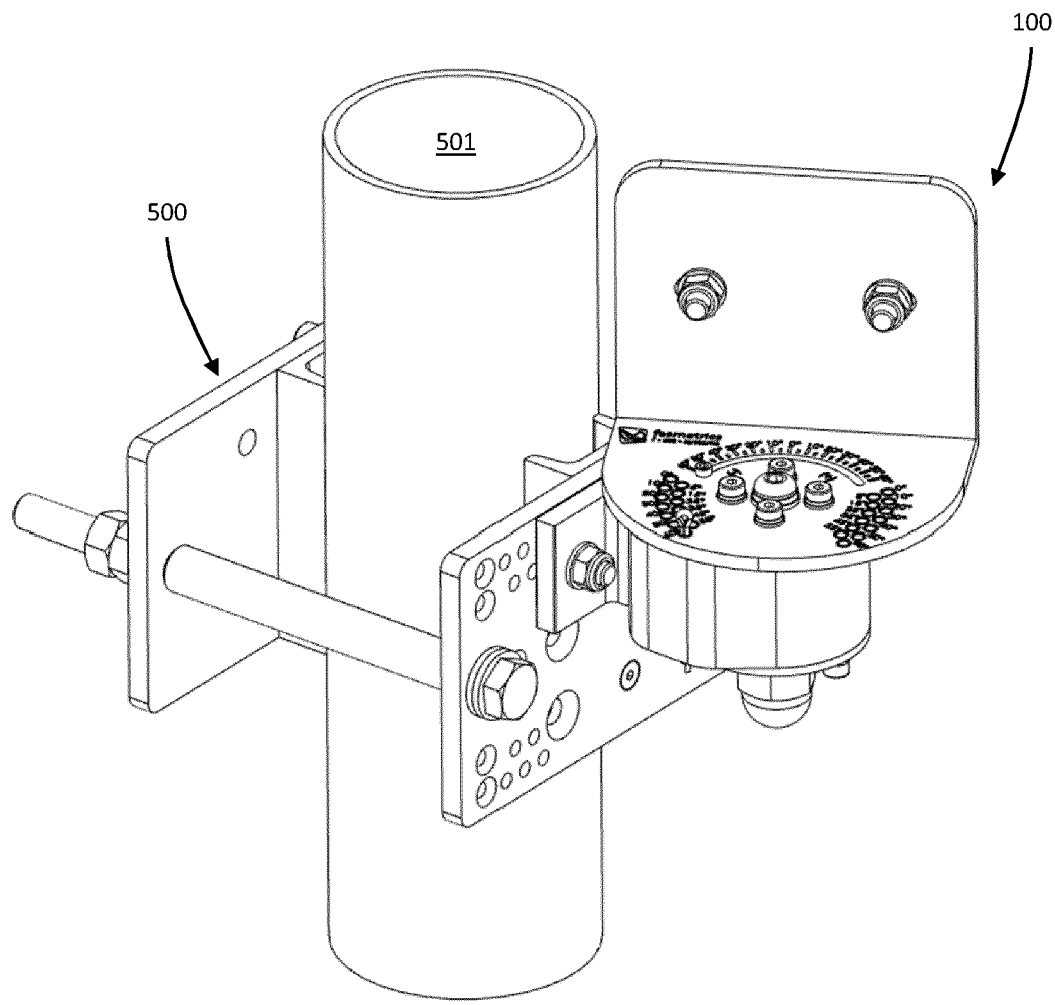
Figure 11A:
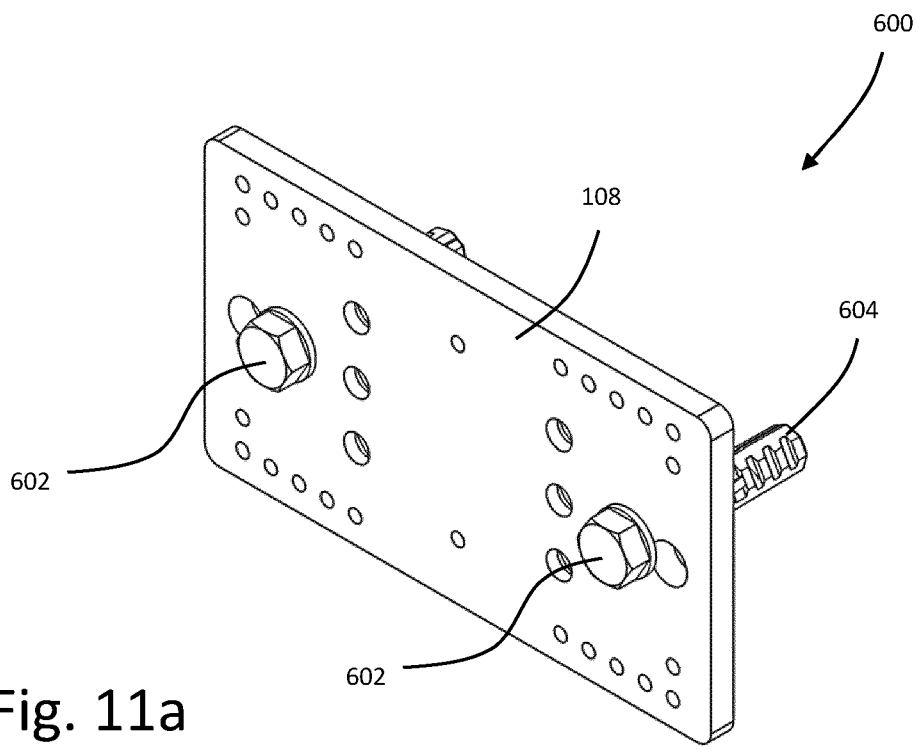
FIGS. 11a and 11b are perspective views of a fifth antenna mounting bracket in accordance with the first embodiment of the present invention.
Figure 11B:
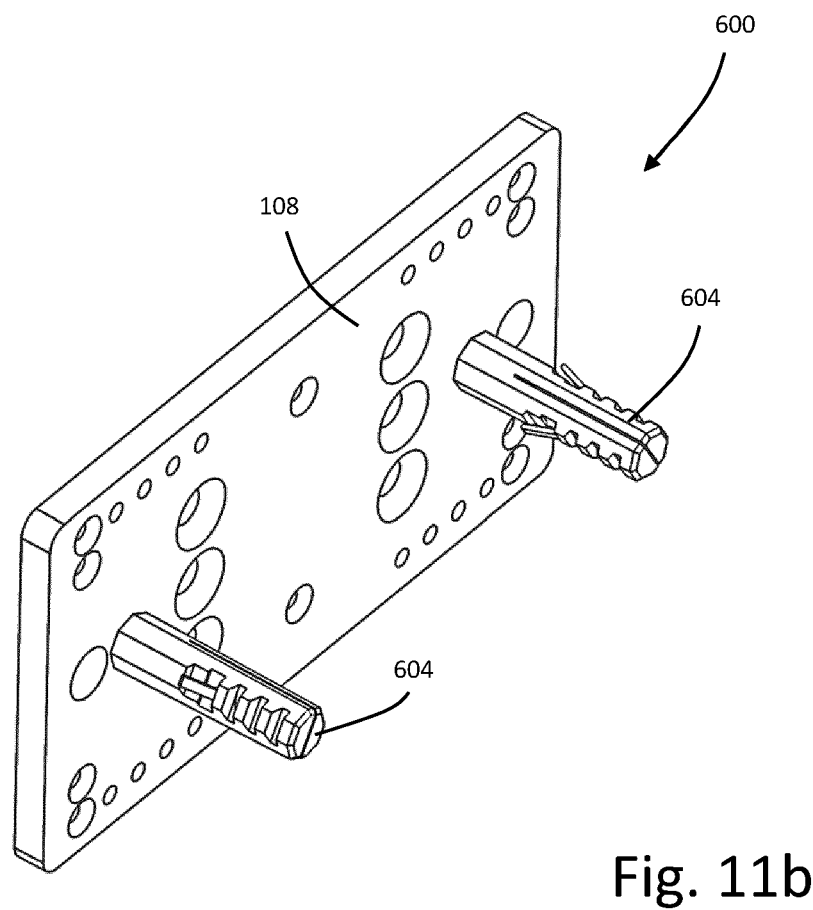

The P-type bracket assembly 500 shown in FIGS. 10a to 10c comprises a bracket plate 108, a back plate 110, two pole clamp plates 112, and two clamp bolts 502 (with locking nuts 504).

The P-type bracket is used for circle section mast members, such as pole member 501.

A pole clamp plate 112 is attached to each of the plates 108, 110 via screws 506 engaging the pole clamp plate fixing holes 121, 124 on the plates 108, 100 respectively and the fixing holes 130 on the plates 112.

The back plate 110 is positioned on an opposite side of the member 4 to the bracket plate 108. A first clamping bolt 502 is fed through a clamping hole 119 of the bracket plate and the aligned clamping hole 126 of the back plate. A second clamping bolt 502 is fed through a second clamping hole 119 of the bracket plate and the aligned clamping slot 125 of the back plate. The locking nuts 504 are used to tension the bolts 502 and thereby produce a clamping force on the member 501 to secure the bracket 500 in position.

The steering and locking unit 100 is attached to the bracket plate 108 by securing fasteners through the spaced-apart fixing holes 150 of the unit 100 and the steering unit fixing holes 120. It should be noted that the attachment of the unit 100 to the plate 108 takes place before the plate 108 is assembled with the rest of the bracket 200 to clamp the member 501. The installed unit 100 is shown in FIG. 10c.

P-type brackets are an option for installation of the azimuth steering units 100, when the user may not want to replace the legacy antenna "support". The azimuth steering functionality of the unit 100 can be provided on the poles of legacy antenna "supports".

W-Type Bracket 600

The W-type bracket is for installation of an antenna on a wall. The bracket plate 100 can be attached to a wall via screws 602 through the holes 119, and wall plugs 604. The steering and locking unit is attached as described above.

Spacers 700, 700', 800

Figure 12:
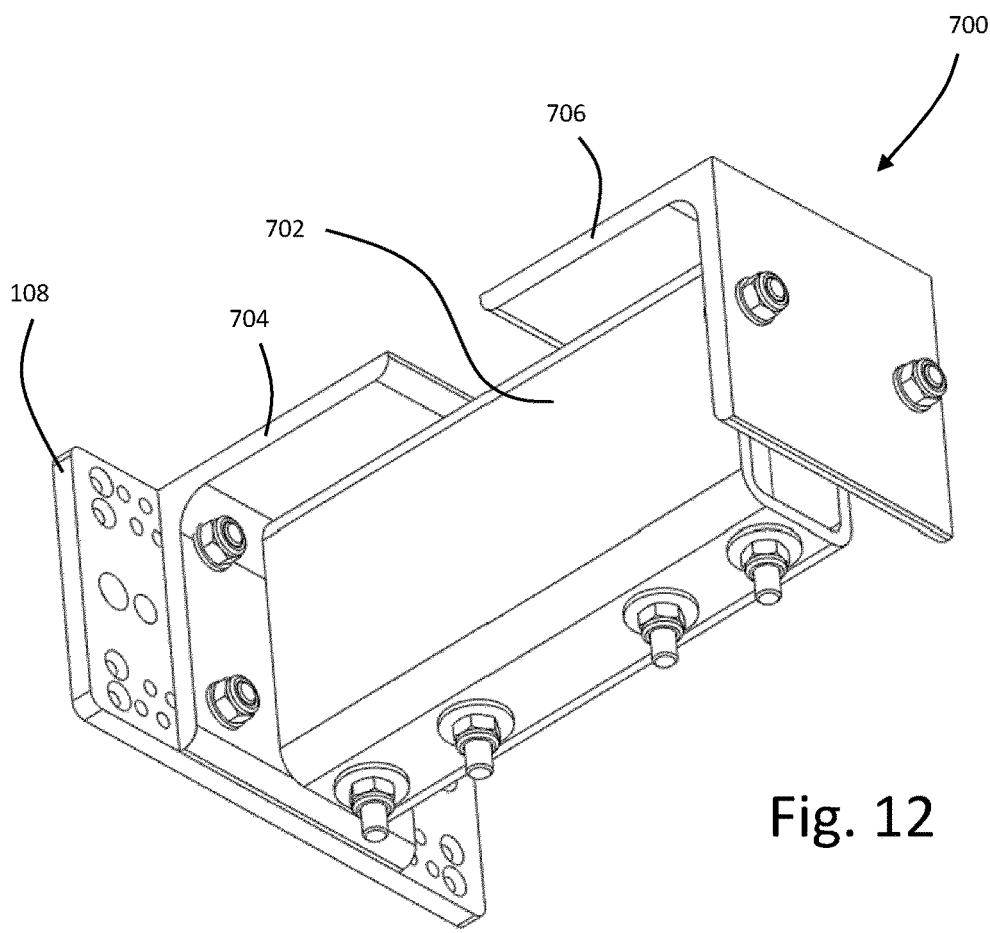
FIGS. 12a and 12b are perspective views of a first spacer for use with the first embodiment of the present invention.

Referring to FIG. 12, a spacer 700 is shown for use with any of the above brackets. The spacer 700 comprises a tubular section 702 having a first angled plate 704 at a first end and a second angled plate 706 at a second end. The angled plates 702, 704 are welded to the tubular section 702. The spacer 700 can be used to increase the distance from the mast member to the antenna, if required (e.g. for range of movement).

Figure 13:
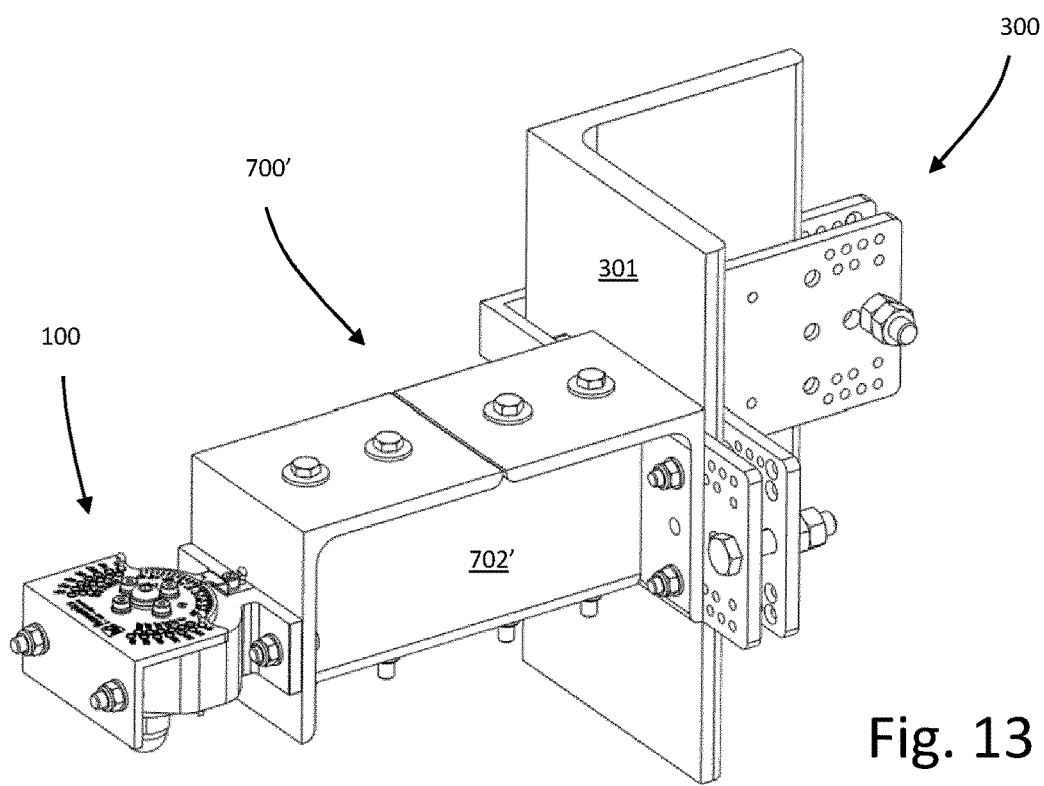
FIG. 13 is a perspective view of a second spacer for use with the first embodiment of the present invention.

Referring to FIG. 13, a spacer 700' is shown installed between the steering unit 100 and bracket 300. The spacer 700' is similar to the spacer 700, but the tubular section 702' is shorter than the tubular section 702 thus providing slightly less spacing from the mast member 301 to the antenna attached to the steering unit 100.

Figure 14:
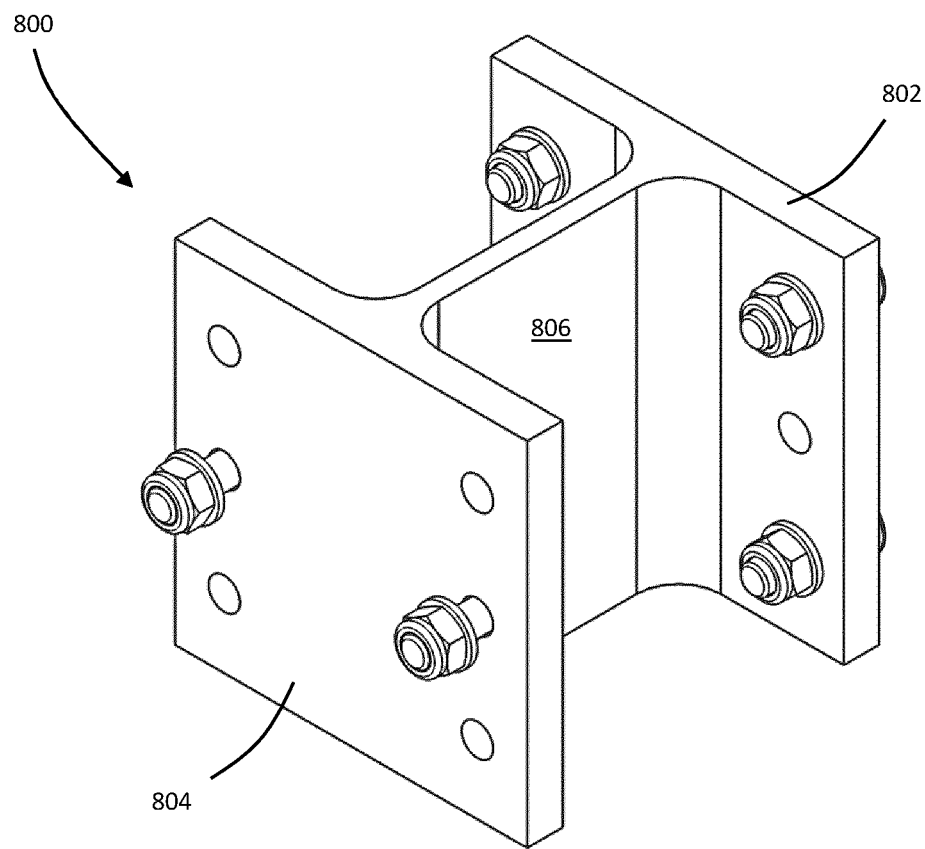

Referring to FIG. 14, a simpler fixed-length spacer 800 is shown. The spacer 800 is generally I-beam shaped with a flange 702 at a first end for attachment to one of the above brackets, and a flange 704 at a second end for attaching the steering unit 100. A rib 706 spans the spaced-apart flanges 702, 704.

Advantageously, when deploying antennas of high lengths and widths, where brackets need to be placed positioned far from the mast section on the horizontal plane, to achieve azimuth steering of 120 degree range and tilt inclination of 20 degree range (up-tilt or down-tilt) without clashing on the mast structural members, spacers can be of assistance.

Apart from the horizontal spacers 700, 700' and 800, vertical spacers (not shown) may be also of use. Vertical spacers may extend vertically from the azimuth steering unit 100 in order to displace the antenna mounting points if needed. Since, the mast vertical structural members have limited available surface area for antenna mounting (due to the fact that the horizontal and diagonal cross-members are fixed to them in close patterns, and cannot be removed), as well as the fact that the antenna's vertical spacing of its top and bottom mounting points are fixed in position (which makes it very likely to coincide with the horizontal and diagonal cross-member mounting points on the mast vertical structural members), vertical spacers may be deployed to tackle the problem.

Advantageously, using the vertical spacer on J-type bracket, one may use antennas of different length i.e. one antenna of 2.6 meters and 2 antennas of 2 meters length by using the vertical spacer configurations on the bottom azimuth steering units.

Kit

In use, the present invention comprises a kit of parts comprising several components common to at least two of the above bracket assemblies (e.g. the plate 108). This provides the installer with the ability to select a combination of parts from the kit based on the type of member the antenna needs to be attached to.

After removal of the legacy support, the universal clamp arrangement of the present invention can be constructed from the kit, assembled with the steering and locking mechanism and clamped to the mast. Two such assemblies are configured in a spaced apart vertical relationship, with the axes of the steering units aligned on the azimuth steering axis Z' (FIG. 1).

Use

The present invention can be used on new antenna installations, but is well-suited to replacement of existing legacy installations. Referring to FIG. 1, the known system on the left hand side can be replaced with the new system (using the clamps of the present invention) on the right hand side. This alleviates the identified problems with the prior art.

Second Embodiment

A second embodiment of the present invention is shown in FIGS. 15a to 20. It will be understood that the second embodiment is used with a steering and locking unit 100 of FIGS. 2a and 2b.

Figure 16A:
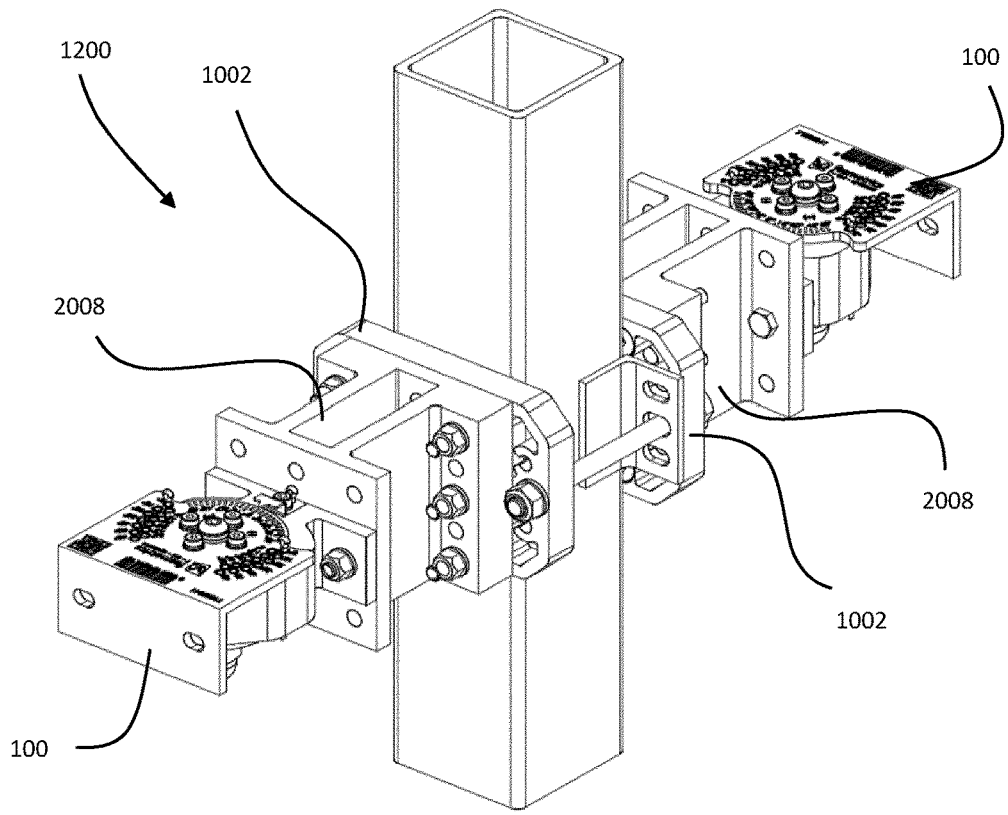
FIGS. 16a and 16b are perspective and plan views of a first antenna mounting bracket in accordance with the second embodiment of the present invention.
Figure 16B:
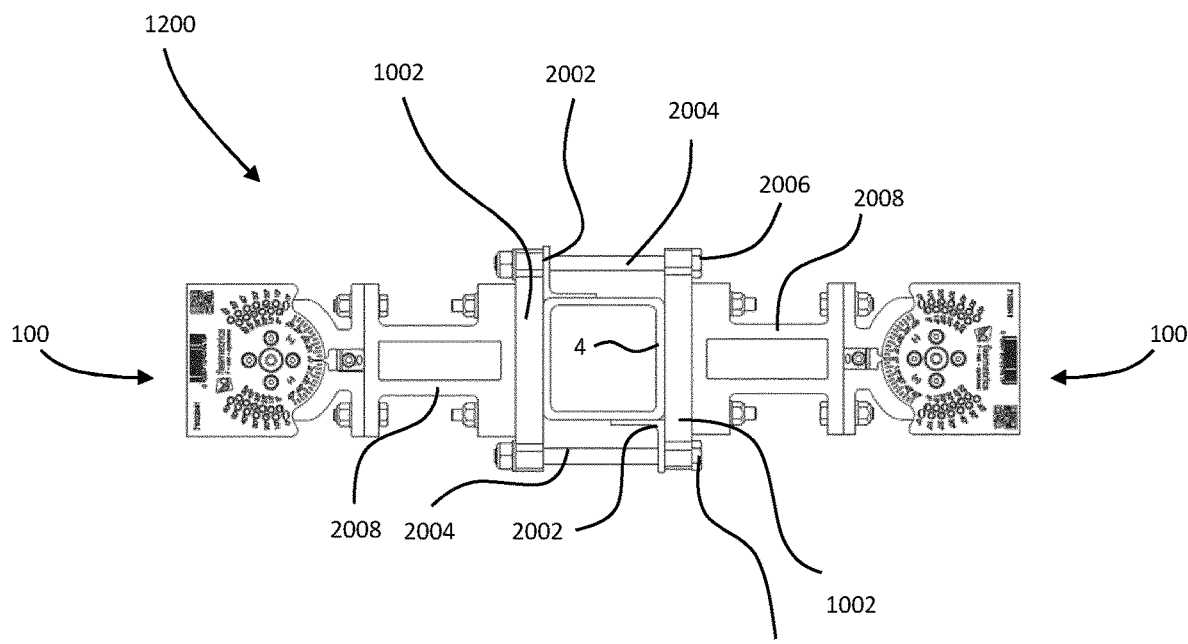
Figure 17A:
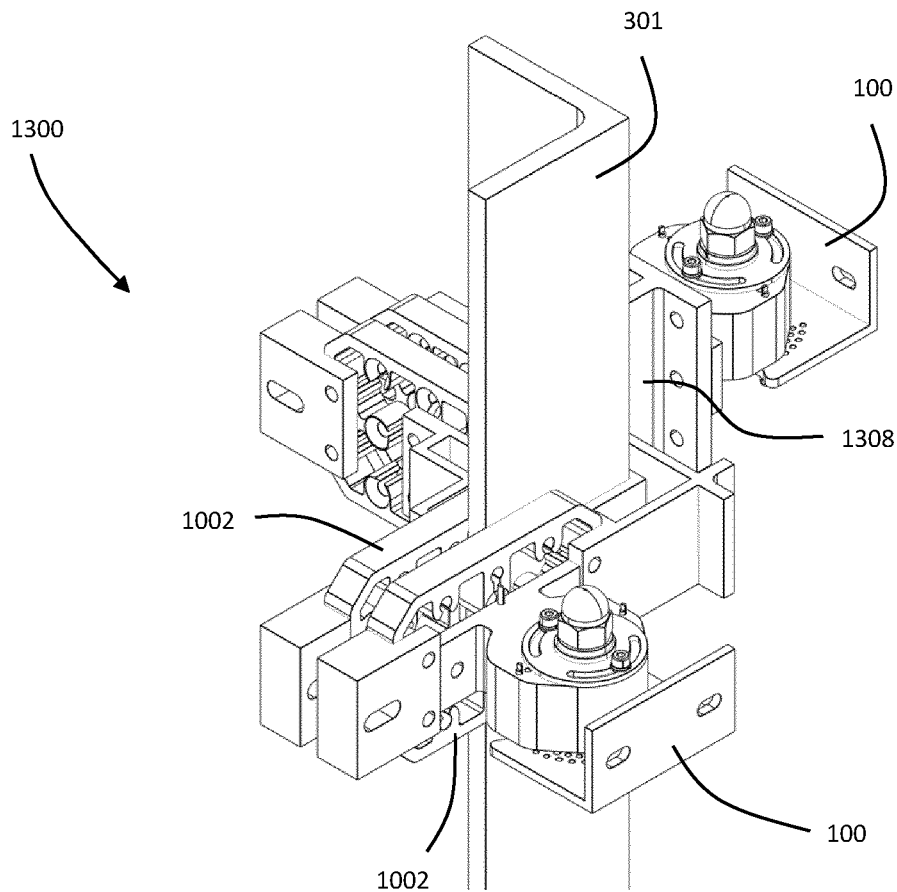
FIGS. 17a and 17b are perspective and exploded views of a second antenna mounting bracket in accordance with the second embodiment of the present invention.
Figure 17B:
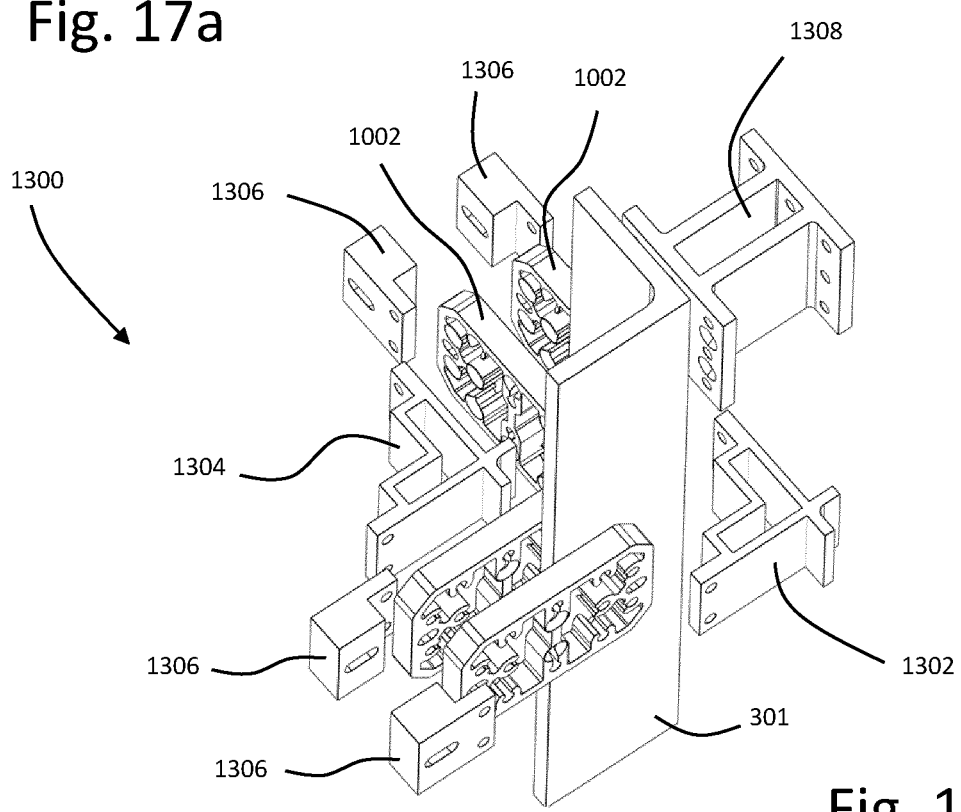
Figure 18A:
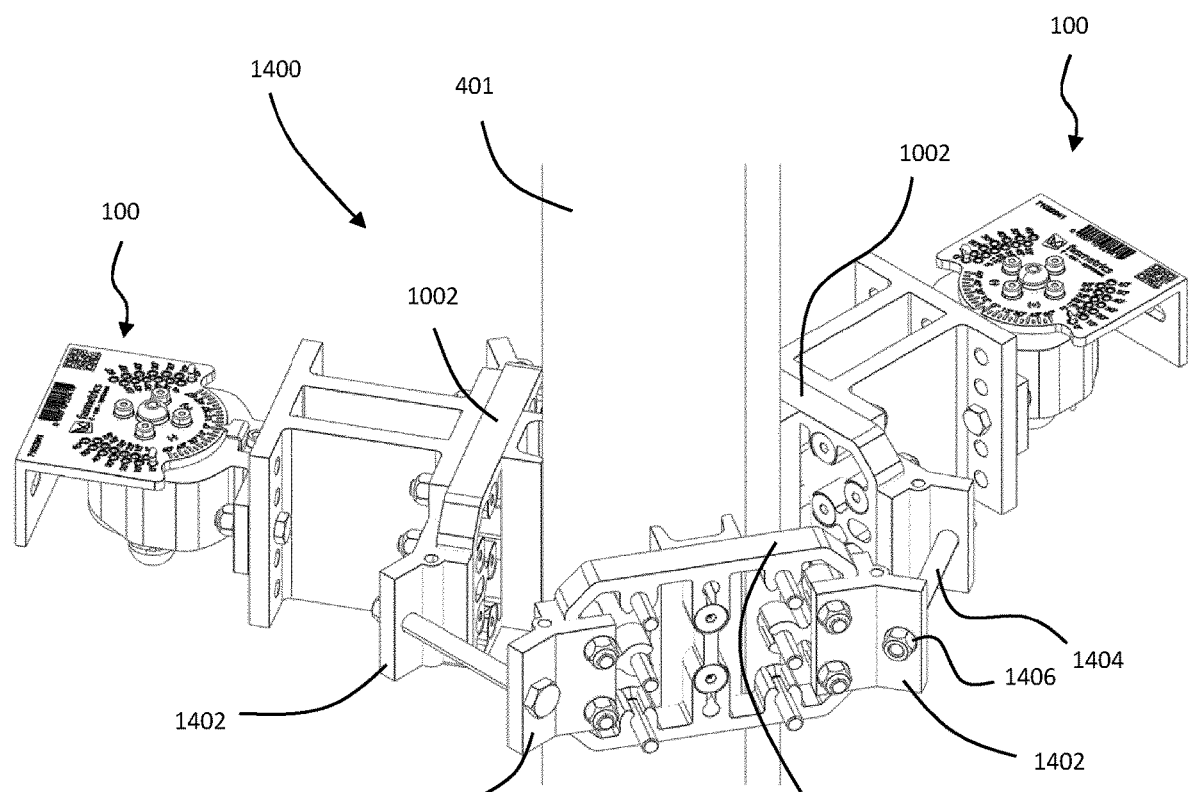
FIGS. 18a to 18b are perspective and plan views of a third antenna mounting bracket in accordance with the second embodiment of the present invention.
Figure 18B:
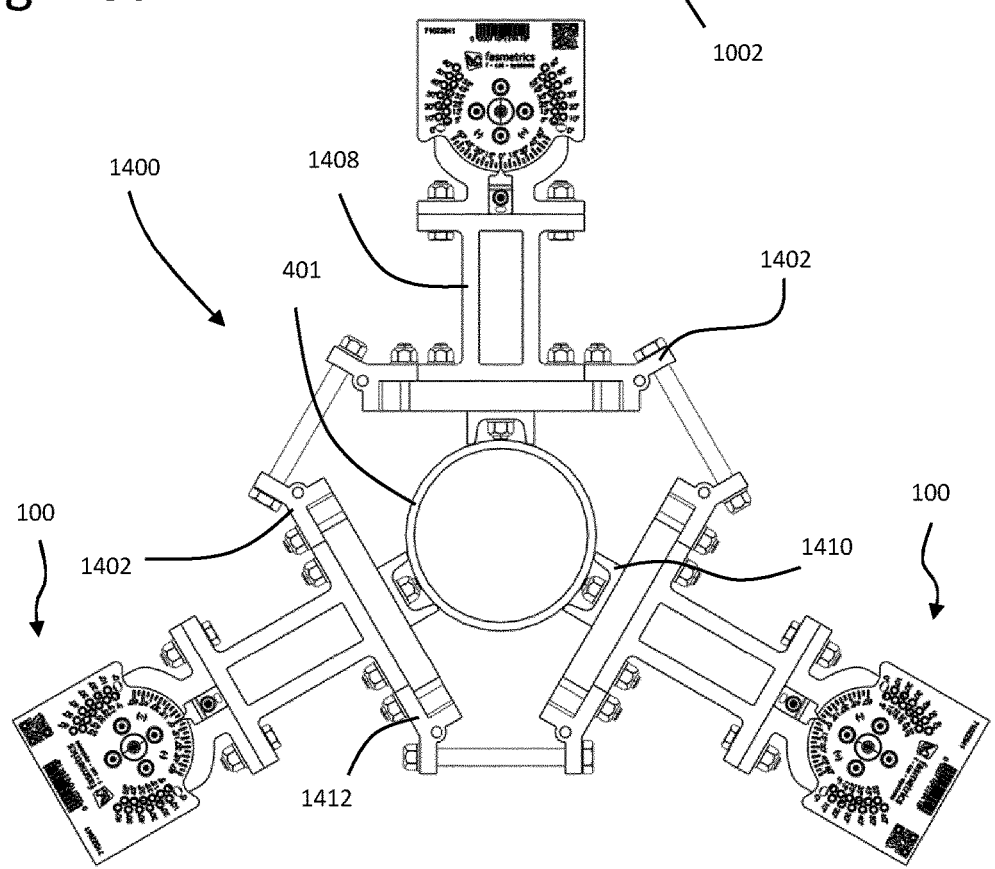
Figure 19A:
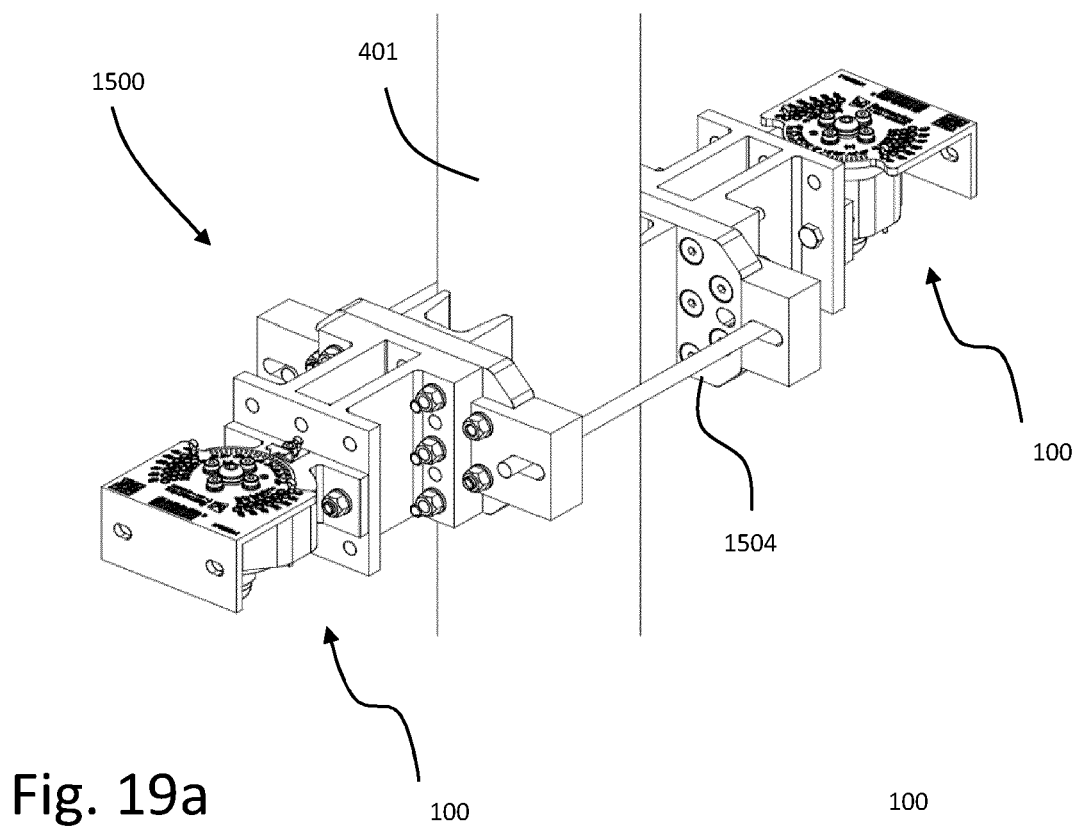
FIGS. 19a and 19b are perspective views of a fourth antenna mounting bracket in accordance with the second embodiment of the present invention.
Figure 19B:
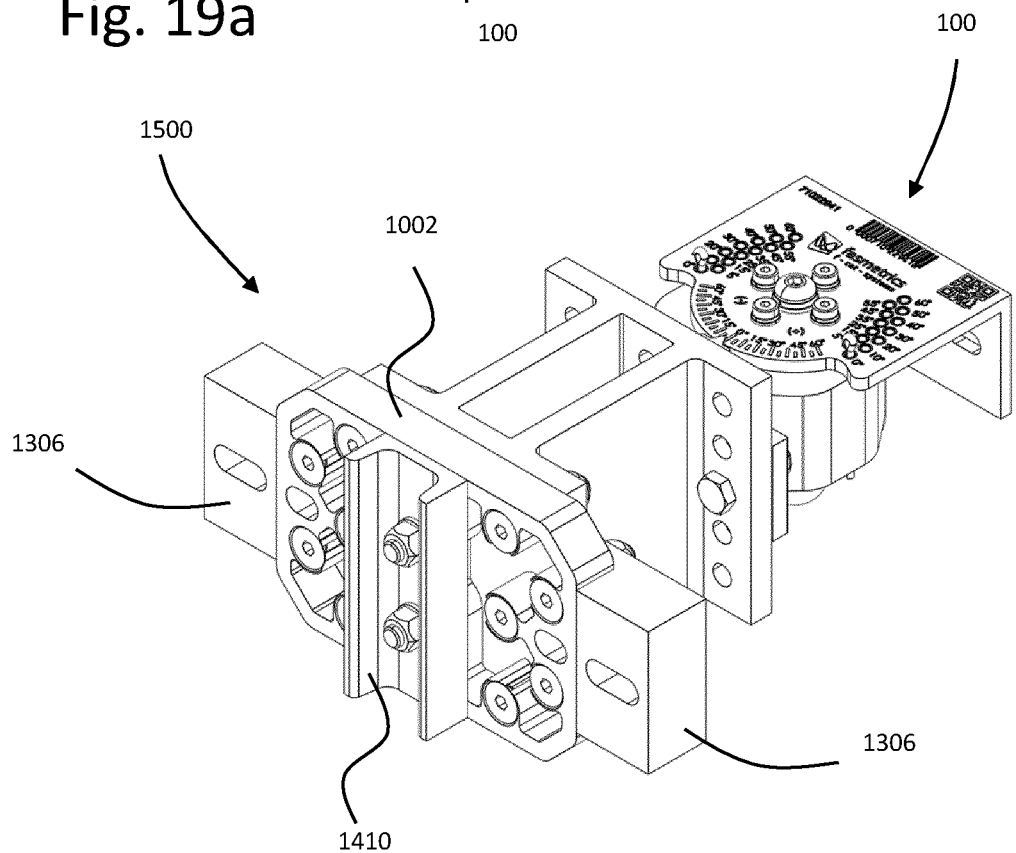
Figure 20:
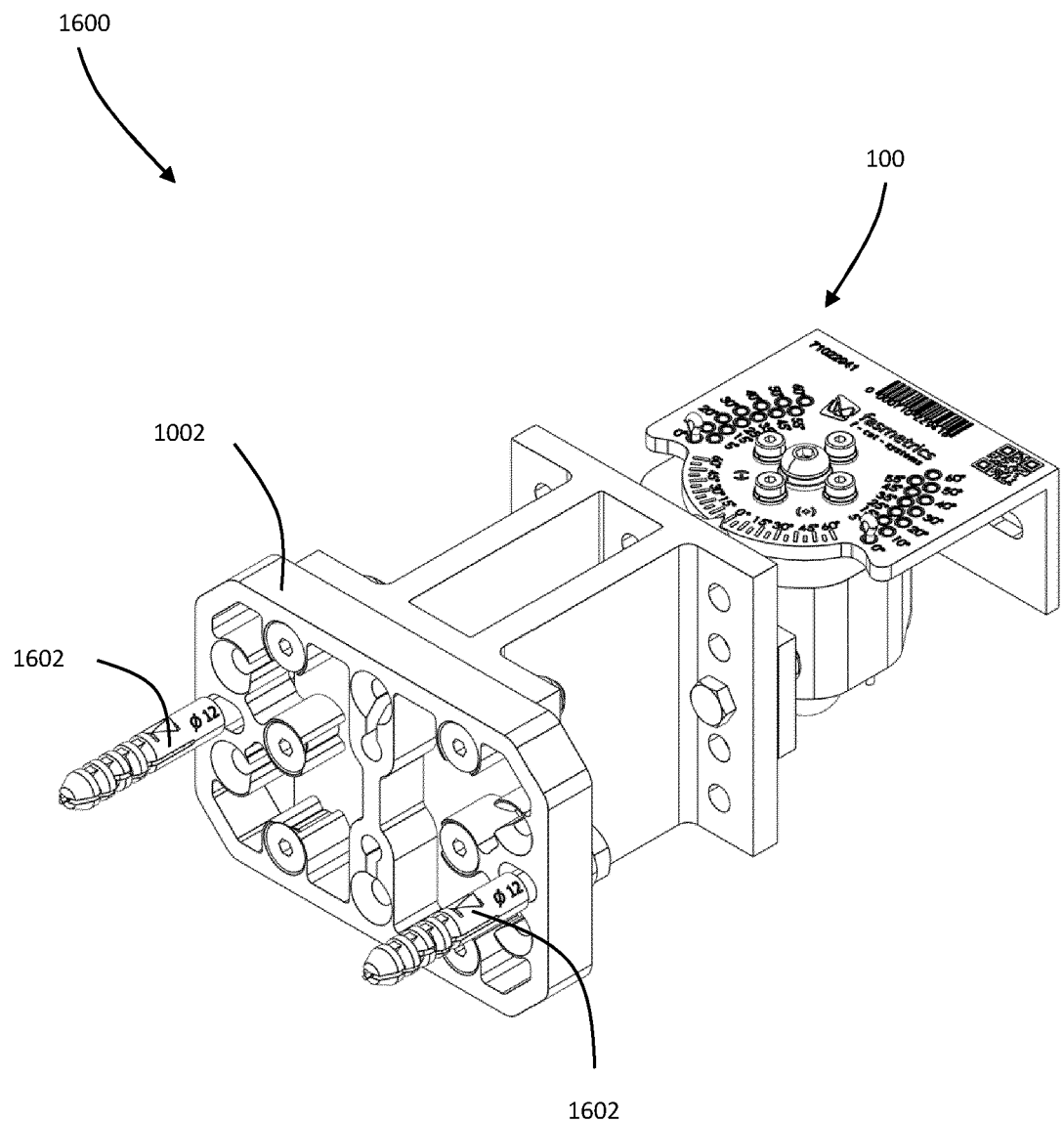
FIG. 20 is a perspective view of a fifth antenna mounting bracket in accordance with the second embodiment of the present invention.

According to the second embodiment of the present invention, there are five brackets for attaching the steering and locking unit 100 (and therefore an antenna) to a range of structures. The different types of brackets are:

H-type bracket 1100—for attachment to square sections (FIGS. 16a and 16b);
  E-type bracket 1200—for attachment to angle sections (FIGS. 17a and 17b);
  J-type bracket 1400—for attachment to circular sections (FIGS. 18a and 18b);
  P-type bracket 1500—for attachment to circular sections (FIGS. 19a and 19b);
  W-type bracket 1600—for attachment to walls (FIG. 20).

The brackets form part of an antenna mounting kit or system, comprising a bracket plate 1000—used in all types of bracket.

Each bracket H, E, J, P is essentially an adaptor to clamp the relevant section of the structure and present a face for attachment of the steering and locking unit 100. The clamps do not rely on drilling holes or openings in the underlying structure (with the exception of the W-type bracket for walls).

Bracket Plate 1000

Figure 15A:
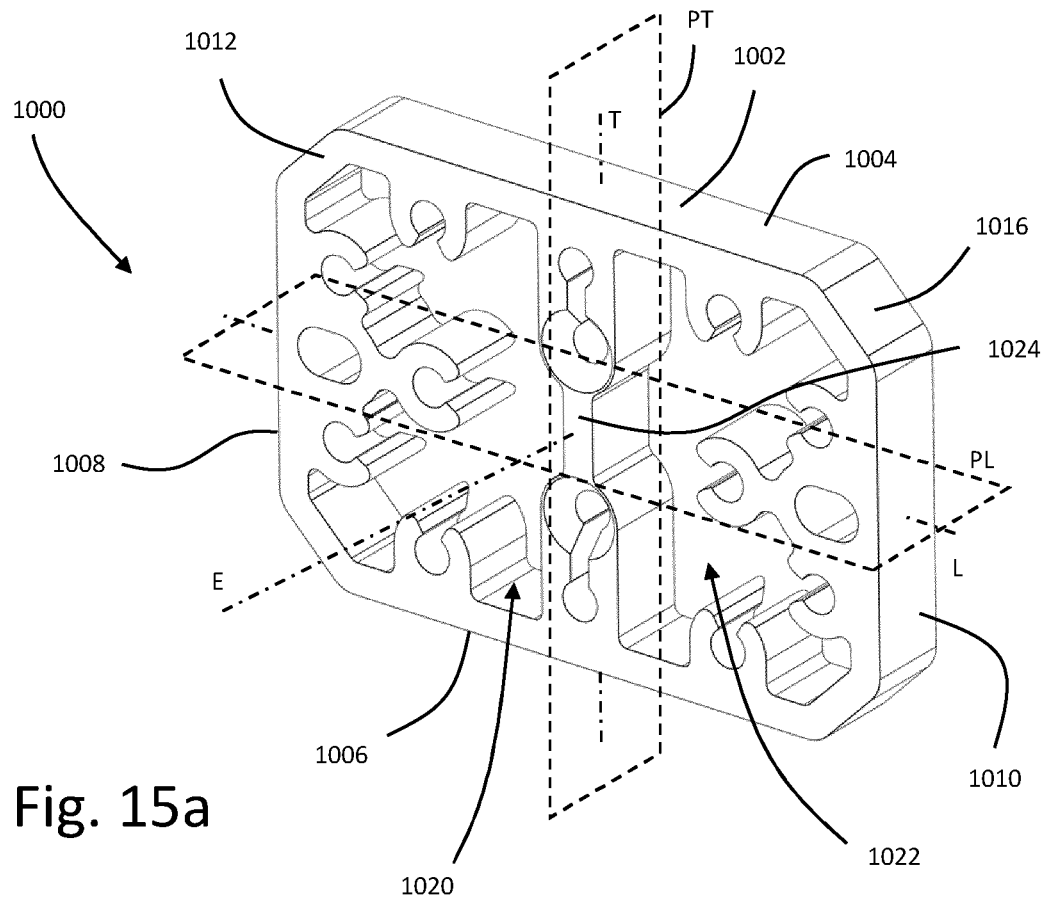
FIGS. 15a and 15b are perspective views of a steering and locking unit for use with a second embodiment of the present invention.
Figure 15B:
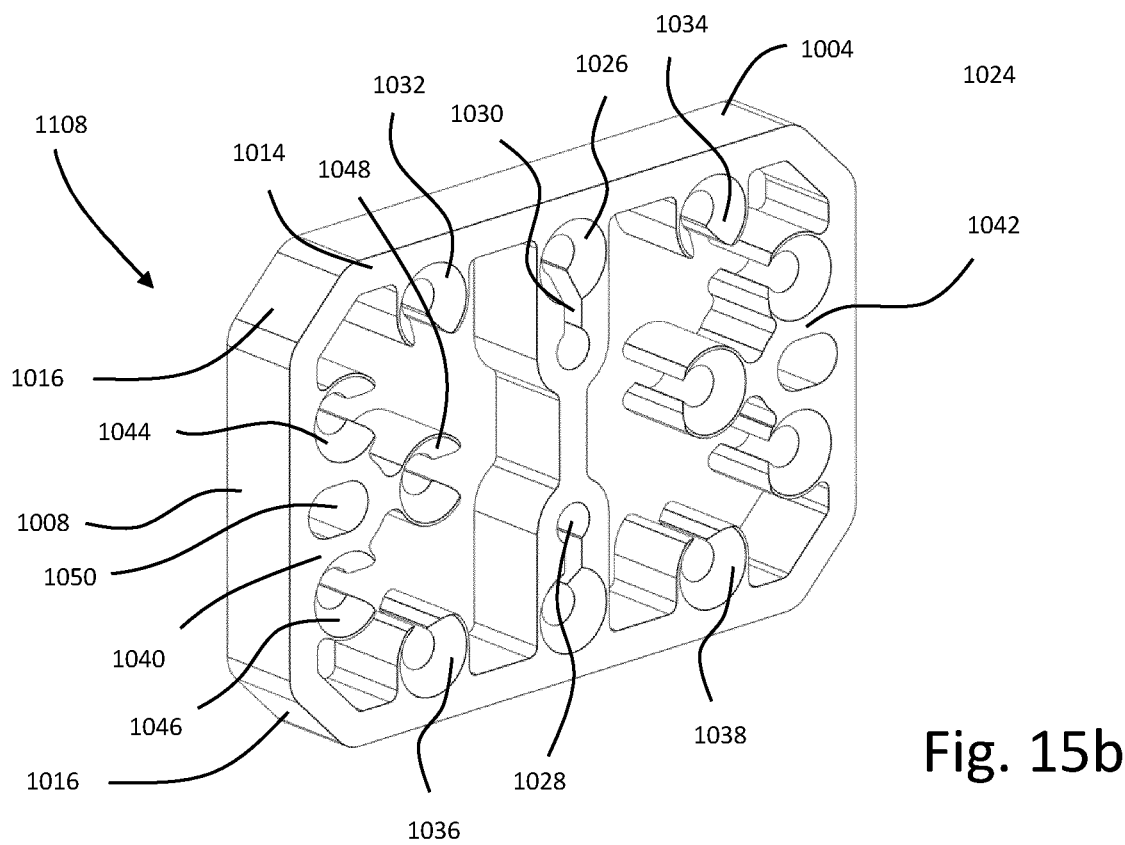

Referring to FIGS. 15a & 15b, the bracket plate 1000 is an extruded, rectangular plate 1002. The extrusion profile comprises a plurality of through-bores as described below.

The plate 1002 is generally prismatic along an extrusion/depth axis E. It is also symmetrical about a transverse plane of symmetry PT, coincident with a transverse axis T and symmetrical about a longitudinal plane of symmetry PL, coincident with a long axis L.

The plate 1002 is generally rectangular having long edges 1004, 1006, short edges 1008, 1010, a first planar face 1012 and a second opposite planar face 1014. The corners of the plate 1002 define 45 degree chamfers 1016.

The plate defines an outer frame or perimeter 1018 defining an endless rectangular loop, having a pair of though-openings 1020, 1022 divided by a central spine 1024.

The central spine defines two outer circular bores 1026, and two inner circular bores 1028. Each inner bore and outer bore pair is connected by a slot 1030. The outer bores 1026 are countersunk to the second face 1014, and the inner bores countersunk to the first face 1012.

Two C-shaped bosses 1032, 1034 are provided projecting into respective though-openings 1020, 1022 from one long side, and two opposing C-shaped bosses 1036, 1038 are provided projecting into respective though-openings 1020, 1022 from the other long side. Each C-shaped boss 1032, 1034, 1036, 1038 defines a circular opening countersunk to the second planar face 1014.

At each end of the plate 1002 there are provided two inwardly projecting bosses 1040, 1042 extending into respective though-openings 1020, 1022. Each boss 1040, 1042 is a mirror image of the other, and each defines three circular openings 1044, 1046, 1048 in a triangular arrangement with a central obround/slot opening 1050. The circular openings are countersunk to the second planar face 1014. Each opening 1044, 1046, 1048 is defined on a C-shaped formation on the respective boss.

It will be noted that the openings in the bosses 1032, 1034 and the central opening 1048 in the boss 1040 are vertically aligned. The openings 1044, 1046 and obround opening 1050 are also vertically aligned.

It will be understood that with the exception of countersinking, the bracket plate 1000 can be manufactured by extrusion and therefore constructed from e.g. aluminium with very little waste, making a light, strong structure.

H-Type Bracket 1200

The H-type bracket assembly 1200 shown in FIGS. 16a and 16b comprises two bracket plates 1002, two angle sections 2002, two clamp bolts 2004 (with locking nuts 2006), two spacers 2008, and two steering and locking units 100.

The H-type bracket is used for square section mast members, such as upright member 4 in FIGS. 16a & 16b.

The angle sections 2002 are attached to the plates 1002 with bolts passing through the openings, 1044. This secures the angle section 2002 to the plate 1002 and aligns the slot opening 1050 of the plate with a corresponding opening on the angle section 2002. This allows each plate 1002 to be attached to the member 4 via the angle section 2002, and the clamp bolts 2004 to extend through the slot openings 1050 in each plate 1002 to clamp the member 4 therebetween.

In this embodiment, the spacers 2008 are attached to the plates 1002 via a series of three bolts on each side, passing through the aligned openings 1032, 1034 & 1048. The bolt heads become flush with the second planar face 1014 of the plate 1002 due to the countersinks. This allows the second planar face 1014 to abut the member 4 as shown.

The steering and locking units 100 are attached to the spacers.

It will be noted that this arrangement may be used without the spacers such that the steering and locking units 100 are attached directly to the plates 1002.

This H-type bracket can be installed as in the first embodiment, and shares the advantages of that embodiment.

E-Type Bracket 1300

The E-type bracket 1300 is used for angle sections such as the member 301 in FIGS. 17a and 17b.

The E-type bracket assembly shown in FIGS. 7a and 7b comprises four bracket plates 1002, an extruded outer angle plate 1302, an inner angle plate 1304, four extruded extension bars 1306 and two steering and locking units 100. A spacer 1308 is also shown.

The bracket 1300 is formed from an inner and outer subassembly with the member 301 clamped therebetween.

The inner subassembly comprises two plates 1302 attached at 90 degrees by attaching each to the outer surface of a respective leg of the inner angle plate 1304 with mechanical fasteners. Two extension bars 1306 are attached to the free ends of the plates 1302.

The outer subassembly comprises two plates 1302 to which the steering and locking units 100 are attached. It will be noted that in this embodiment, one is attached via a spacer 1308, although that is optional. The plates are attached to each other at 90 degrees by attaching each to the inner surface of a respective leg of the outer angle plate 1302 with mechanical fasteners. Two extension bars 1306 are attached to the free ends of the plates 1302.

The member 301 is then clamped between the inner and outer assemblies with the plates 1302 contacting the member 301. The assemblies are secured together with clamping bolts (not shown) passing through openings the aligned extension bars 1306.

Different vertical mast members utilise different extruded angle outer plates. For example, instead of a right angled section (90 degrees), for a member with a 60 degree internal angle, a 60 degree outer plate would be utilised.

J-Type Bracket 1400

The J-type bracket is used for circular sections such as the member 401 in FIGS. 18a and 18b.

The J-type bracket assembly shown in FIGS. 18a and 18b comprises three bracket plates 1002, six extruded angle sections 1402, three clamping bolts 1404 with associated locking nuts 1406, three spacers 1408 and three pole clamp plates 1410.

The angle sections 1402 are extruded components, each having an "L" shaped formation 1412 for receiving the end of a bracket plate 1002, and a clamping bolt flange 1414 extending therefrom. The angle sections 1402 are attached to each end of the brackets 1102 with mechanical fasteners, leaving the clamping flanges projecting at an angle thereto. The clamp plates 1410 are attached to the second face 1014 of the plate 1002 with fasteners engaging the openings 1028 (and associated countersunk formations on the first face 1012). The spacers 1408 are attached to the first face 1012 of each plate 1002, with mechanical fasteners engaging the openings 1026. The steering and locking units 100 attached to each spacer 1408. It will be noted that the spacers are optional.

The three subassemblies of plates 1002, clamp plates 1410, angle sections 1402, spacers 1408 (if used) and units 100 are then used to clamp the pole 401 with the pole clamp plates 1410 each engaging the pole as with the first embodiment. The clamping bolts 1404 engage the clamping bolt flanges 1414 to provide the clamping force to hold the bracket assembly in place.

P-Type Bracket 1500

The P-type bracket assembly 500 shown in FIGS. 19a and 19b is similar to the J-type arrangement, but only utilises two plates 1002 and units 100. Instead of angle sections 1402, this arrangement utilises the extruded extension bars 1306 from the E-type bracket with clamping bolts 1504. Pole clamp plates 1410 are attached to the plates 1002 to clamp the pole in a diametrically opposed fashion, providing two steering and locking units 100 180 degrees apart.

W-Type Bracket 1600

The W-type bracket is for installation of an antenna on a wall. The bracket plate 1002 can be attached to a wall via screws 1602, and wall plugs 604. The steering and locking unit 100 is attached via spacers described above.

First Alternative Configuration of J-Type Bracket 1700

Figure 21:
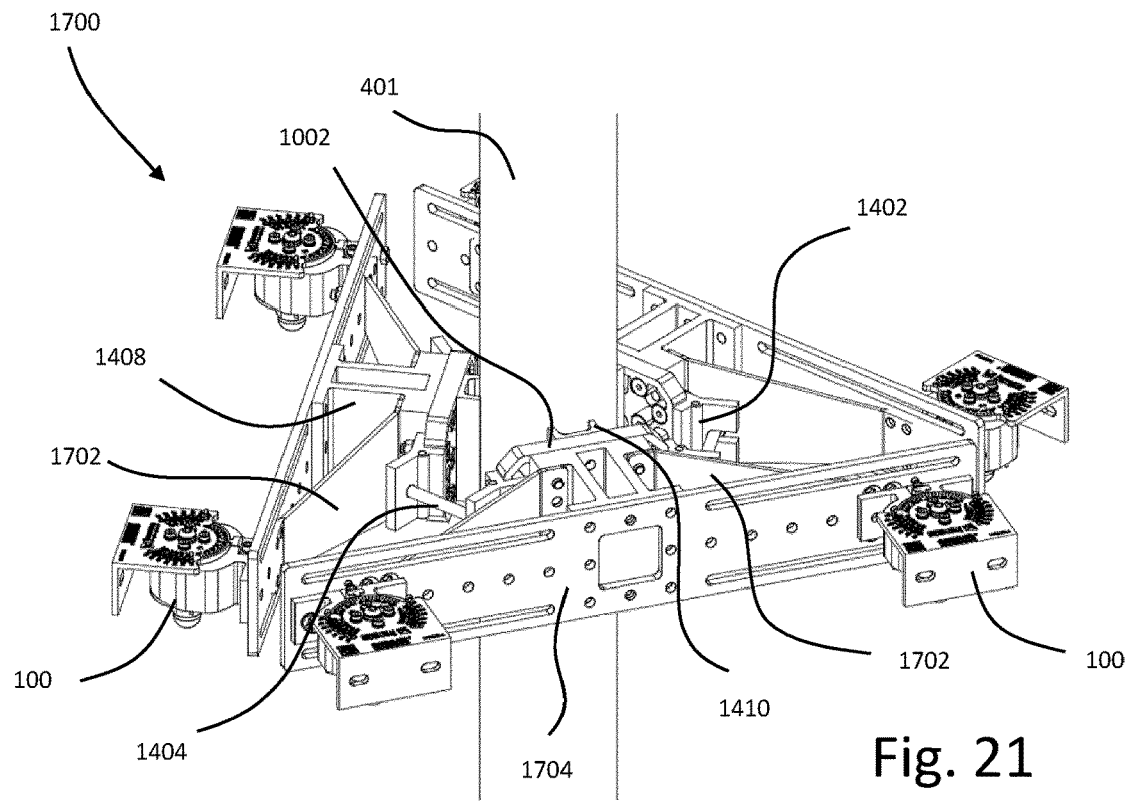
FIG. 21 is a perspective view of a sixth antenna mounting bracket in accordance with the second embodiment of the present invention.

Referring to FIG. 21 there is shown an alternative configuration for the J-type bracket which is also used for circular sections such as the member 401.

As with the J-type bracket 1400, the assembly shown in FIG. 20 comprises three bracket plates 1002, six extruded angle sections 1402, three clamping bolts 1404 with associated locking nuts, three spacers 1408 and three pole clamp plates 1410. In addition, six angled plates 1702 and three elongate mounting plates 1704 are provided.

Instead of three steering units 100 being attached to the end of each of the spacers 1408, the elongate mounting plates 1704 are mounted to the spacers at a mid point thereof. The elongate mounting plates 1704 are supported at either end by the angled plates 1702 which extend from the base of the spacer 1408. The two angled plates 1702 therefore form a "V" shape. This allows two steering units 100 to be mounted to either end of the elongate mounting plates 1704, meaning this installation can be used to mount six antennas.

The pole 401 is clamped as described above.

Second Alternative Configuration of J-Type Bracket 1800

Figure 22:
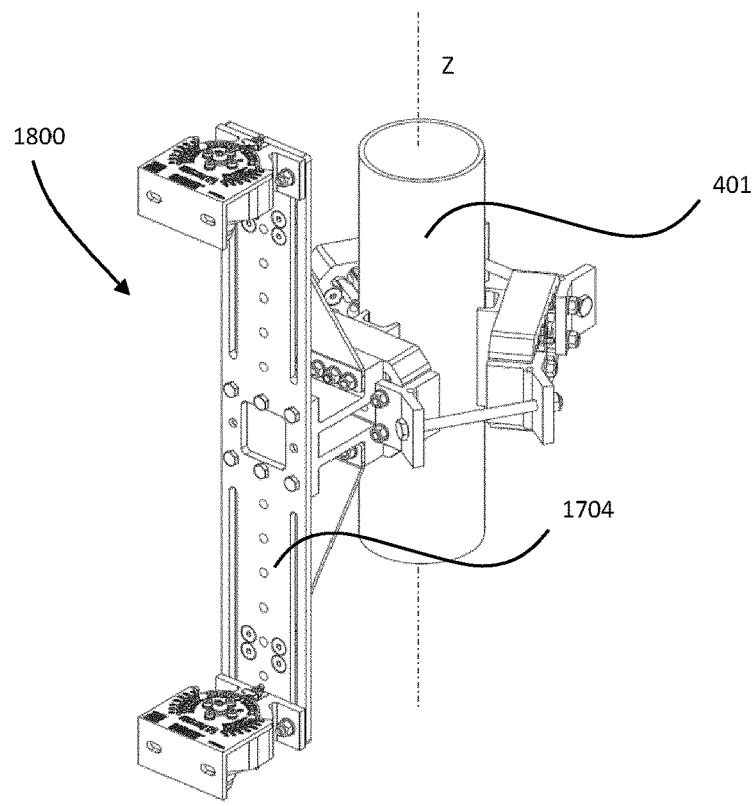
FIG. 22 is a perspective view of a seventh antenna mounting bracket in accordance with the second embodiment of the present invention.

Referring to FIG. 22, it will be noted that the elongate mounting plates 1704 may also be mounted vertically, such that the top and bottom of each antenna can be mounted to a single plate 1704 via a vertically aligned pair of steering units 100, both of which rotate about a common azimuth steering axis Z.

Third Alternative Configuration of J-Type Bracket 1450

Figure 23:
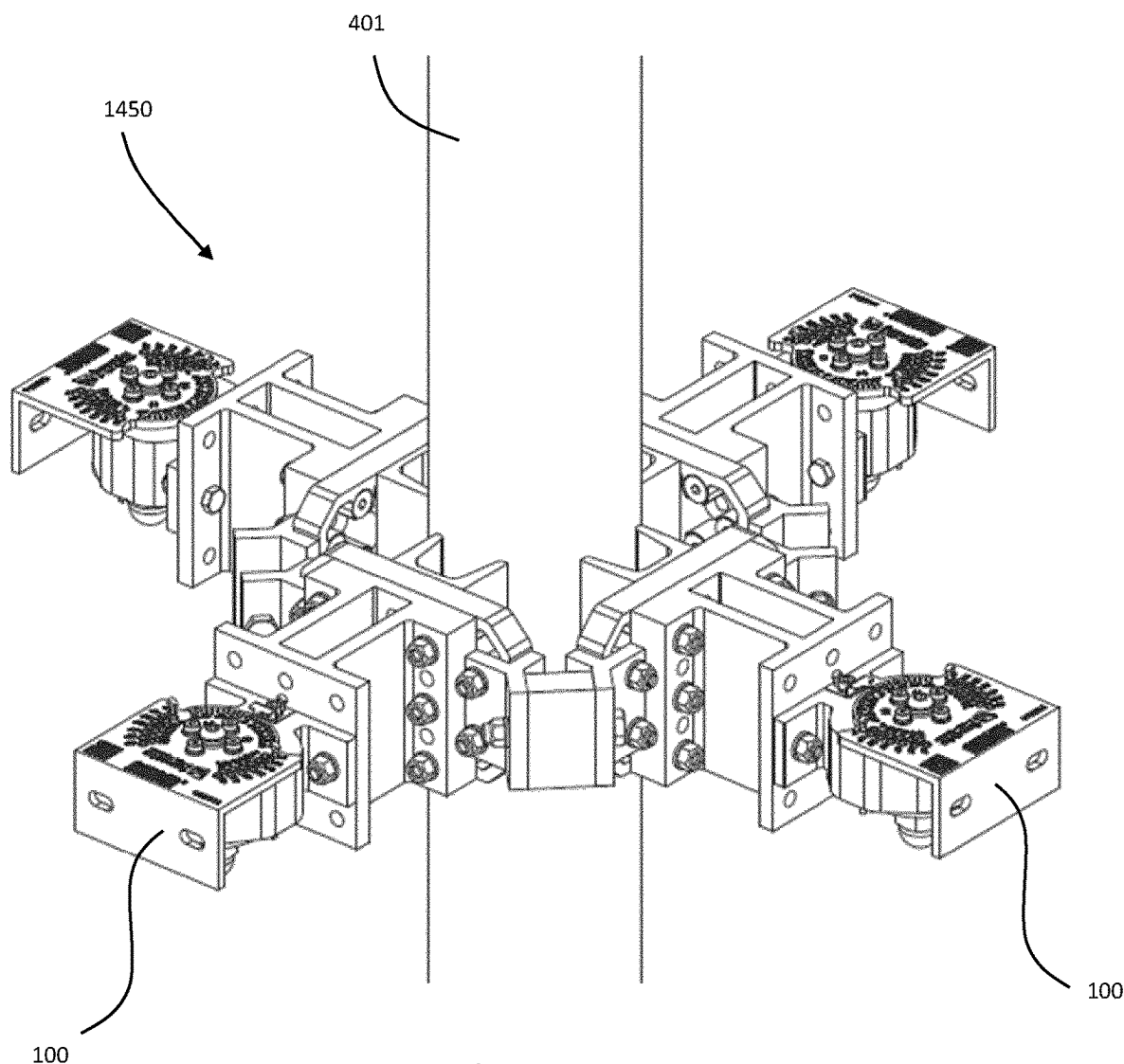
FIG. 23 is a perspective view of an eighth antenna mounting bracket in accordance with the second embodiment of the present invention.

In FIG. 23, a J-type bracket 1450 comprises four plates 1002 joined together to clamp the pole, and a single steering unit 100 is attached to each plate 1002.

Fourth Alternative Configuration of J-Type Bracket 1452

Figure 24:
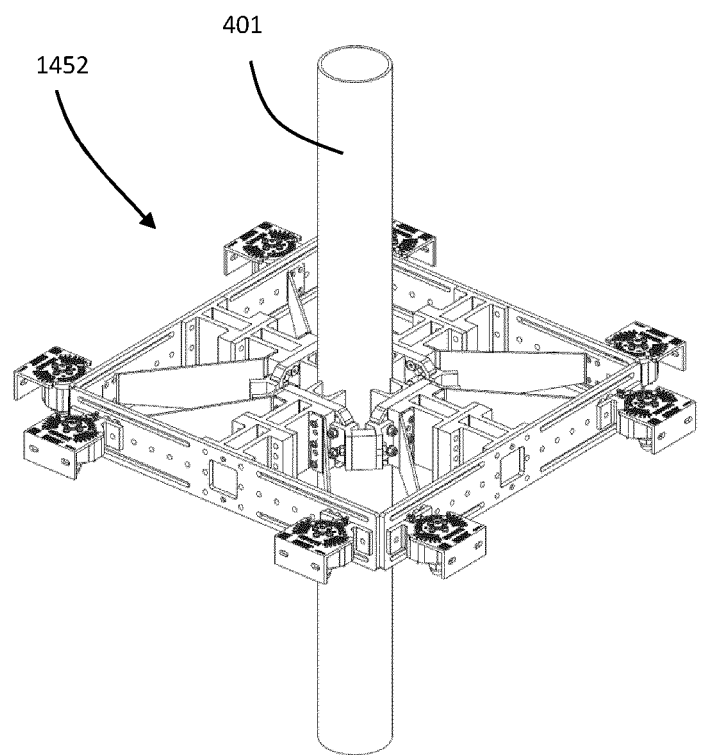
FIG. 24 is a perspective view of a ninth antenna mounting bracket in accordance with the second embodiment of the present invention.

In FIG. 24, a further J-type bracket 1452 is similar to the bracket 1700 of FIG. 21, but has four plates each mounting two steering units for eight in total.

Fifth Alternative Configuration of J-Type Bracket 1454

Figure 25:
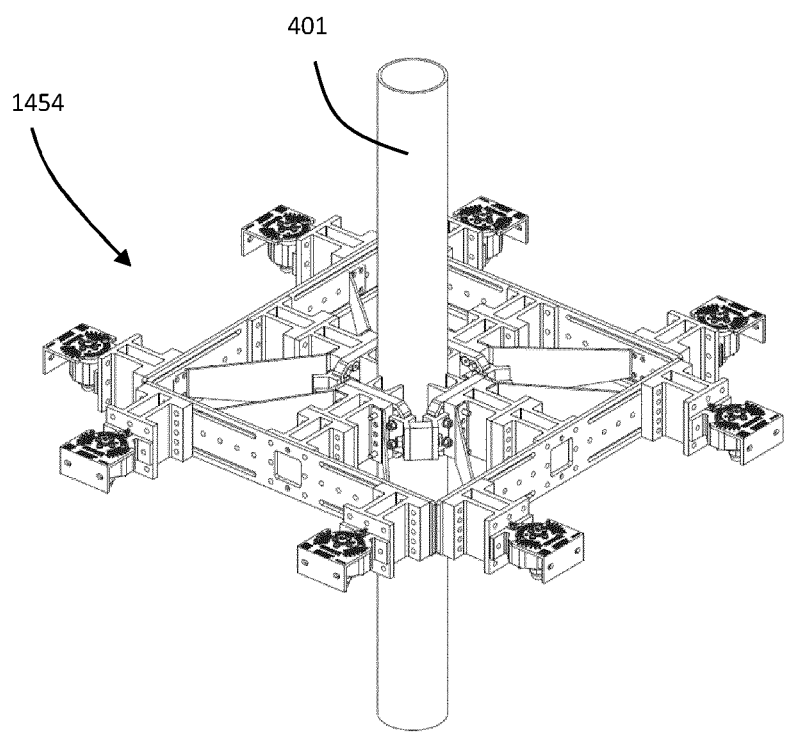
FIG. 25 is a perspective view of a tenth antenna mounting bracket in accordance with the second embodiment of the present invention.

In FIG. 25, a fifth J-type bracket 1452 is similar to that of FIG. 24, but with spacers mounted between each elongate mounting plate and two steering units.

Sixth Alternative Configuration of J-Type Bracket 1456

Figure 26:
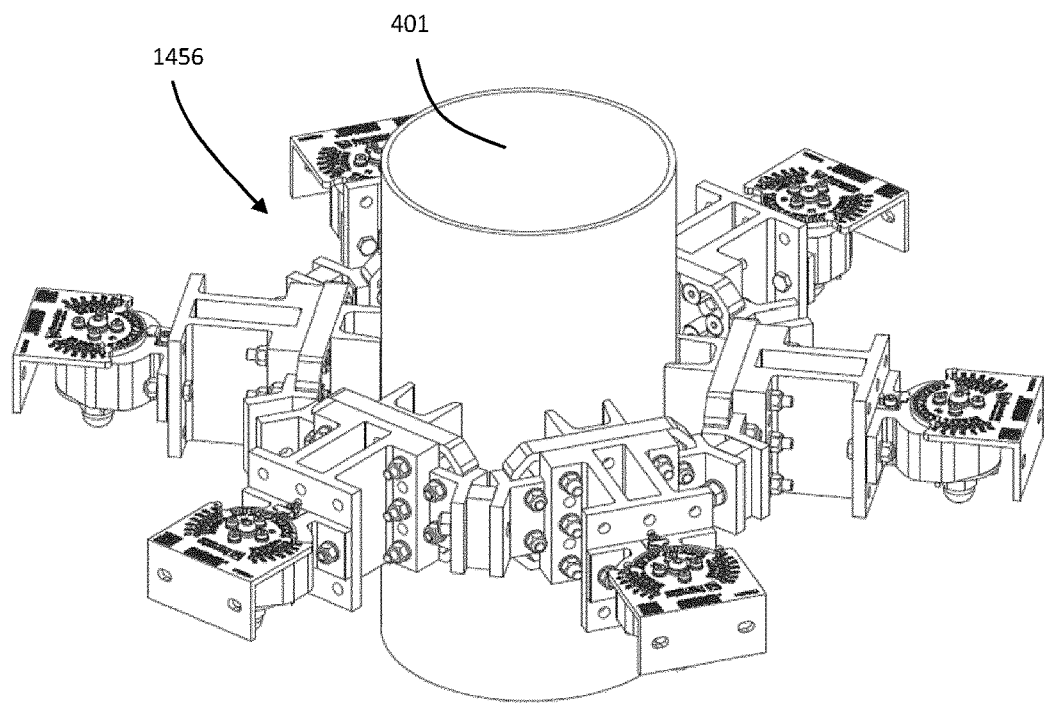
FIG. 26 is a perspective view of a eleventh antenna mounting bracket in accordance with the second embodiment of the present invention; and, FIG. 27 is a perspective view of a twelfth antenna mounting bracket in accordance with the second embodiment of the present invention.

In FIG. 26, a sixth J-type bracket 1456 is shown. Six plates 1002 encircle and clamp the pole 401, each having a steering unit attached thereto via a spacer.

Seventh Alternative Configuration of J-Type Bracket 1456

Figure 27:
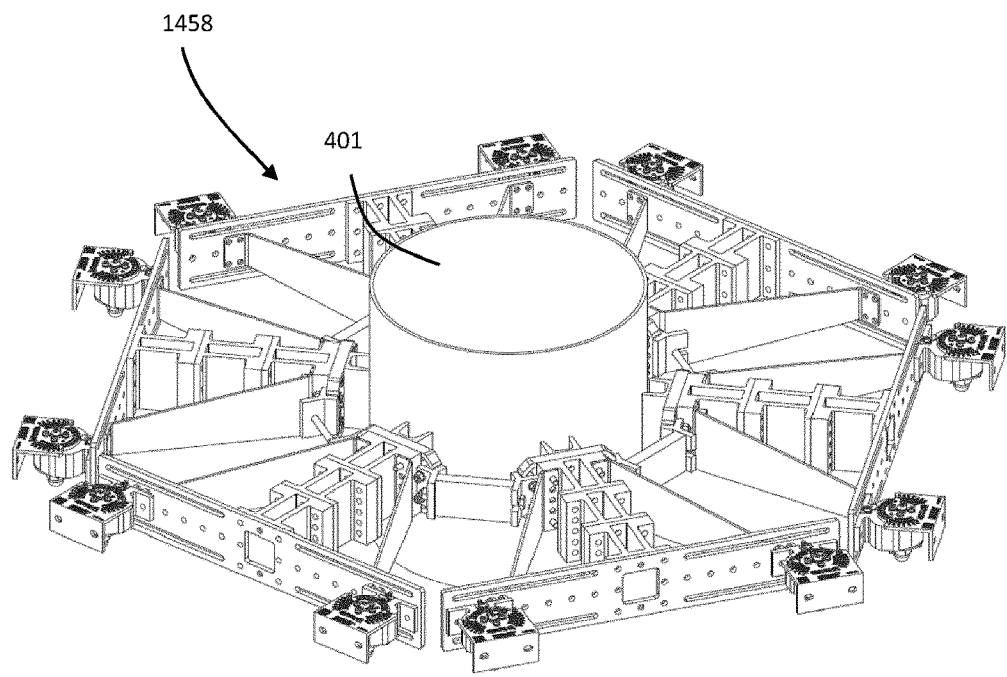

In FIG. 27, a seventh J-type bracket 1458 is shown. Six plates 1002 encircle and clamp the pole 401, each having an elongate plate attached thereto via a plurality of spacers, each elongate plate having two steering units attached thereto for a total of twelve such units.

Kit

In use, the second embodiment of present invention comprises a kit of parts comprising at least one component common to at least two of the above bracket assemblies (e.g. the plate 1002). The supplier holds an inventory comprising such a kit, and when a customer provides the supplier with a mast member profile (e.g. square section, angle section, circle section) the supplier can select the appropriate parts from the kit to send to the customer. In this way the customer receives a set of parts which may be easily assembled to make the bracket suitable for his installation.

Alternatively, the installer may be provided with a kit of parts from which to select a combination of parts from the kit based on the type of member the antenna needs to be attached to.

After removal of the legacy support, the universal clamp arrangement of the present invention can be constructed from the kit, assembled with the steering and locking mechanism and clamped to the mast. Two such assemblies are configured in a spaced apart vertical relationship, with the axes of the steering units aligned on the azimuth steering axis Z' (FIG. 1).

Use

The present invention can be used on new antenna installations, but is well-suited to replacement of existing legacy installations. Referring to FIG. 1, the known system on the left hand side can be replaced with the new system (using the clamps of the present invention) on the right hand side. This alleviates the identified problems with the prior art.

The invention claimed is:

1. An antenna support system comprising:
a mast comprising an integral mast member;
a first mast member clamp comprising a first steering unit;
a second mast member clamp comprising a second steering unit;
wherein:
in the first mast member clamp, the first steering unit is connected to a first universal clamp plate, wherein the first universal clamp plate can be adapted with a first set of components to form a first clamp for clamping a first cross section, and a second set of components to form a second clamp for clamping a second, different cross section; and
in the second mast member clamp, the second steering unit is connected to a second universal clamp plate, wherein the second universal clamp plate can be adapted with a further first set of components to form a further first clamp for clamping a first cross section, and a further second set of components to form a further second clamp for clamping a second, different cross section; and
an antenna;
wherein the first and second mast clamps are independent of each other and each clamped to the mast member at spaced-apart positions, such that the only load paths between the steering units are the mast member and the antenna.

2. An antenna support system according to claim 1, wherein each mast member clamp comprises:
a universal clamp plate; and,
at least one adaptor component configured to adapt the universal clamp plate to engage a cross-sectional profile of the integral mast member.

3. An antenna support system according to claim 2, wherein the universal clamp plate is an extruded component.

4. An antenna support system according to claim 2, wherein the at least one adaptor comprises a base attached to the first universal clamp plate, and two opposing arms providing a "U" shape section with the free ends of the arms engaging a circular cross-section of the integral mast member.

5. An antenna support system according to claim 4, comprising a third universal clamp plate, wherein the first, second and third universal clamp plates are joined in a loop to clamp the circular cross-section of the integral mast member in the centre of the loop.

6. An antenna support system according to claim 2, wherein
the mast member has an angle cross-section; and
the first and second universal clamp plates are joined by the at least one adaptor component, wherein the at least one adaptor component is configured to hold the universal clamp plates at an angle to each other being the same as an angle of the cross-section.

7. An antenna support system comprising:
a universal clamp kit having:
a first and a second universal clamp plate;
a first set of components for adapting the universal clamp plates to form a first clamp to clamp a first shape of antenna mast section; and,
a second set of components for adapting the universal clamp plates to form a second clamp to clamp a second shape of antenna mast section; and,
an azimuth steering unit configured for attachment to the first universal clamp plate.

8. An antenna support system according to claim 7, wherein the universal clamp plate is an extruded component.

9. An antenna support system according to claim 8, wherein the first and second shapes of antenna mast section are selected from: a square, a planar section, an angle section and a circular section.

10. An antenna support system according to claim 8, comprising at least two clamp bolts, each clamp bolt extending between two universal clamp plates to apply a compressive clamping force to clamp the antenna mast section.

11. An antenna support system according to claim 8, wherein one of the first and second clamp engages with the first shape of antenna mast section such that the first clamp cannot be rotated relative to the first shapes of the antenna mast section.

12. An antenna support system according to claim 7, wherein the universal clamp plate comprises a flat surface for attachment to a wall.

13. An antenna support system according to claim 7, wherein the azimuth steering unit comprises a housing containing a rotational joint.

14. An antenna support system according to claim 7, wherein the azimuth steering unit comprising a locking mechanism configured to mechanically lock the steering unit at a predetermined angle.

15. A method of configuring an antenna support system comprising the steps of:
providing:
    a mast comprising an integral mast member having a cross-sectional shape;
    a first and a second universal clamp plate;
    a first set of components for adapting the universal clamp plates to form a first clamp type to clamp a first shape;
    a second set of components for adapting the universal clamp plates to form a second clamp type to clamp a second shape;
selecting one of the first and second sets of components based on whether the cross-sectional shape of the integral mast member is the first shape or the second shape;
configuring two of the first clamp type or the second clamp type depending on the selection of the first and second sets of components;
attaching a steering unit to each of the two of the first clamp type or the second clamp type; and
attaching the antenna to the integral mast member via the two of the first clamp type or the second clamp type such that the two of the first clamp type or the second clamp type are independent of each other and each clamped to the integral mast member at spaced-apart positions.

16. A method of installing an antenna support system, comprising:
    configuring the antenna support system according to the method of claim 15;
    assembling the first and a second universal clamp plates with the one of the first and second sets of components to form a first clamp;
    clamping the integral mast member with the first clamp.

17. A method of installing an antenna support system according to claim 16, comprising:
    assembling a third and a fourth universal clamp plates with a further one of the first and second sets of components to form a second clamp;
    clamping the integral mast member with the second clamp; and,
    attaching an antenna to the first and second clamps.

18. A method of installing an antenna support system according to claim 17, comprising:
    providing a first steering unit and a second steering unit;
    installing the first and second steering units between the respective first and second clamps and the antenna.

19. A method of installing an antenna support system according to claim 18, comprising the steps of:
    measuring the orientation of the mast member;
    identifying a desired antenna heading;
    calculating the required azimuth steering angle of the steering unit to achieve the desired antenna heading;
    locking the steering units at the required azimuth steering angle before clamping the mast member with the mast clamps.

20. A method of modifying an assembly of a mast and cellular antenna according to claim 19, wherein the step of locking takes place before a step of elevating the antenna to the required height.

* * * * *